(12) United States Patent
Gormley et al.

(10) Patent No.: US 8,737,926 B2
(45) Date of Patent: May 27, 2014

(54) SCHEDULING OF BEAMFORMED DATA TO REDUCE INTERFERENCE

(75) Inventors: Eamonn Gormley, Redmond, WA (US); Chaz Immendorf, Mill Creek, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 467 days.

(21) Appl. No.: 13/179,314

(22) Filed: Jul. 8, 2011

(65) Prior Publication Data

US 2012/0009964 A1 Jan. 12, 2012

Related U.S. Application Data

(60) Provisional application No. 61/362,659, filed on Jul. 8, 2010.

(51) Int. Cl.
*H04B 1/00* (2006.01)

(52) U.S. Cl.
USPC ....... 455/63.1; 455/63.4; 455/67.16; 375/235

(58) Field of Classification Search
CPC ..... H04W 16/14; H04W 16/28; H04W 16/18; H04W 7/0634; H04W 72/046
USPC ................ 455/63.1, 63.4, 67.16, 278.1, 296; 375/235, 260
See application file for complete search history.

(56) References Cited

U.S. PATENT DOCUMENTS

| 3,969,674 | A | * | 7/1976 | Tracey | 375/235 |
| 8,412,275 | B2 | * | 4/2013 | Kim et al. | 455/562.1 |
| 2004/0180627 | A1 | | 9/2004 | Dabak et al. | |
| 2005/0287978 | A1 | | 12/2005 | Maltsev et al. | |
| 2008/0192811 | A1 | | 8/2008 | Son | |
| 2009/0185650 | A1 | | 7/2009 | Ravid et al. | |
| 2013/0294533 | A1 | * | 11/2013 | Kim et al. | 375/260 |

OTHER PUBLICATIONS

International Search Report for PCT/US2011/043418 dated Feb. 28, 2012.

* cited by examiner

*Primary Examiner* — Minh D Dao

(57) ABSTRACT

A system and method are disclosed for coordinating the scheduling of beamformed data to reduce interference in a wireless system. A customer premise equipment (CPE) uses a plurality of bits to quantize the phase angle of the beamformed data received by CPE and reports it to its serving base station. The serving base station selects one of the phase adjustment angles based on the bits received from the CPE in order to schedule the data transmission to the CPE. The phase adjustment angles are in "n" degree steps.

23 Claims, 39 Drawing Sheets

1200

| Binary Value | Quantized Phase Difference |
|---|---|
| 00 | 0° |
| 01 | 90° |
| 10 | 180° |
| 11 | 270° |

| 0dB Branch Imbalance | | |
|---|---|---|
| Phase Zone | Average Gain (dB) | Difference from 0 degree phase zone average gain (dB) |
| 0 degree | 5.8 | 0.0 |
| 90 degree / 270 degree | 2.8 | 3.0 |
| 180 degree | -8.2 | 14.0 |

| 3dB Branch Imbalance | | |
|---|---|---|
| Phase Zone | Average Gain (dB) | Difference from 0 degree phase zone average gain (dB) |
| 0 degree | 4.4 | 0.0 |
| 90 degree / 270 degree | 1.6 | 2.9 |
| 180 degree | -6.8 | 11.2 |

| 10dB Branch Imbalance | | |
|---|---|---|
| Phase Zone | Average Gain (dB) | Difference from 0 degree phase zone average gain (dB) |
| 0 degree | 2.2 | 0.0 |
| 90 degree / 270 degree | 0.3 | 1.9 |
| 180 degree | -2.8 | 5.0 |

FIG. 18

Base Station A

| Timeslot | Phase adjustment (degrees) | | | |
|---|---|---|---|---|
| 0 | 0 | 90 | 180 | 270 |
| 1 | 0 | 90 | 180 | 270 |
| 2 | 0 | 90 | 180 | 270 |
| 3 | 0 | 90 | 180 | 270 |
| 4 | - | - | - | - |
| 5 | - | - | - | - |
| 6 | - | - | - | - |
| 7 | - | - | - | - |

Base Station B

| Timeslot | Phase adjustment (degrees) | | | |
|---|---|---|---|---|
| 0 | 0 | 90 | 180 | 270 |
| 1 | 90 | 180 | 270 | 0 |
| 2 | 180 | 270 | 0 | 90 |
| 3 | 270 | 0 | 90 | 180 |
| 4 | - | - | - | - |
| 5 | - | - | - | - |
| 6 | - | - | - | - |
| 7 | - | - | - | - |

Base Station C

| Timeslot | Phase adjustment (degrees) | | | |
|---|---|---|---|---|
| 0 | 0 | 90 | 180 | 270 |
| 1 | 180 | 270 | 0 | 90 |
| 2 | 270 | 0 | 90 | 180 |
| 3 | 90 | 180 | 270 | 0 |
| 4 | - | - | - | - |
| 5 | - | - | - | - |
| 6 | - | - | - | - |
| 7 | - | - | - | - |

Base Station D

| Timeslot | Phase adjustment (degrees) | | | |
|---|---|---|---|---|
| 0 | 0 | 90 | 180 | 270 |
| 1 | 270 | 0 | 90 | 180 |
| 2 | 90 | 180 | 270 | 0 |
| 3 | 180 | 270 | 0 | 90 |
| 4 | - | - | - | - |
| 5 | - | - | - | - |
| 6 | - | - | - | - |
| 7 | - | - | - | - |

FIG. 20

| Timeslot | Frequency Resources Used | | | |
| --- | --- | --- | --- | --- |
| | Phase Adjustment #1 | Phase Adjustment #2 | Phase Adjustment #3 | Phase Adjustment #4 |
| 0 | $F_0 - F_7$ | $F_8 - F_{15}$ | $F_{16} - F_{23}$ | $F_{24} - F_{31}$ |
| 1 | $F_0 - F_7$ | $F_8 - F_{15}$ | $F_{16} - F_{23}$ | $F_{24} - F_{31}$ |
| 2 | $F_0 - F_7$ | $F_8 - F_{15}$ | $F_{16} - F_{23}$ | $F_{24} - F_{31}$ |
| 3 | $F_0 - F_7$ | $F_8 - F_{15}$ | $F_{16} - F_{23}$ | $F_{24} - F_{31}$ |
| 4 | $F_0 - F_7$ | $F_8 - F_{15}$ | $F_{16} - F_{23}$ | $F_{24} - F_{31}$ |
| 5 | $F_0 - F_7$ | $F_8 - F_{15}$ | $F_{16} - F_{23}$ | $F_{24} - F_{31}$ |
| 6 | $F_0 - F_7$ | $F_8 - F_{15}$ | $F_{16} - F_{23}$ | $F_{24} - F_{31}$ |
| 7 | $F_0 - F_7$ | $F_8 - F_{15}$ | $F_{16} - F_{23}$ | $F_{24} - F_{31}$ |

| CPE ID | # Blocks to transmit | Phase Adjustment for best signal level | Optimal Phase Adjustment (in degrees) to reduce interference level and priority for interference reduction | | |
|---|---|---|---|---|---|
| | | BTS A | BTS B | BTS C | BTS D |
| 1 | 14 | 0 | 180 1 | 180 2 | 180 4 |
| 2 | 8 | 0 | 270 4 | 0 4 | 90 1 |
| 3 | 12 | 90 | 90 2 | 0 1 | 0 3 |
| 4 | 6 | 90 | 180 4 | 180 3 | 0 2 |
| 5 | 6 | 180 | 270 1 | 270 2 | 180 3 |
| 6 | 6 | 180 | 0 3 | 270 4 | 0 3 |
| 7 | 10 | 270 | 0 2 | 90 2 | 90 2 |
| 8 | 2 | 270 | 90 2 | 0 1 | 180 3 |
| 9 | 6 | 270 | 180 4 | 180 4 | 270 4 |
| 10 | 10 | 270 | 270 1 | 90 2 | 90 4 |
| Total | 80 | | | | |

| Timeslot | Phase adjustment (degrees) ||||
|---|---|---|---|---|
| 0 | 0 | 90 | 180 | 270 |
| 1 | 0 | 90 | 180 | 270 |
| 2 | 0 | 90 | 180 | 270 |
| 3 | 0 | 90 | 180 | 270 |
| 4 | - | - | - | - |
| 5 | - | - | - | - |
| 6 | - | - | - | - |
| 7 | - | - | - | - |

| Timeslot | Phase adjustment (degrees) ||||
|---|---|---|---|---|
| 0 | 0 | 90 | 180 | 270<br>CPE10[8] |
| 1 | 0 | 90<br>CPE1[6] | 180<br>CPE5[6] | 270 |
| 2 | 0<br>CPE1[8] | 90 | 180 | 270 |
| 3 | 0<br>CPE10[2] | 90 | 180 | 270 |
| 4 | - | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0<br>CPE3[4] | 90 | 180 | 270<br>CPE10[8] |
| 1 | 0 | 90<br>CPE1[6] | 180<br>CPE5[6] | 270 |
| 2 | 0<br>CPE1[8] | 90<br>CPE3[8] | 180 | 270 |
| 3 | 0<br>CPE10[2] | 90 | 180 | 270<br>CPE8[2] |
| 4 | - | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0<br>CPE3[4] | 90 | 180 | 270<br>CPE10[8] |
| 1 | 0<br>CPE2[8] | 90<br>CPE1[6] | 180<br>CPE5[6] | 270 |
| 2 | 0<br>CPE1[8] | 90<br>CPE3[8] | 180 | 270 |
| 3 | 0<br>CPE10[2] | 90 | 180 | 270<br>CPE8[2] |
| 4 | - | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0<br>CPE3[4] | 90 | 180 | 270<br>CPE10[8] |
| 1 | 0<br>CPE2[8] | 90<br>CPE1[6] | 180<br>CPE5[6] | 270<br>CPE7[8] |
| 2 | 0<br>CPE1[8] | 90<br>CPE3[8] | 180<br>CPE7[2] | 270 |
| 3 | 0<br>CPE10[2] | 90 | 180 | 270<br>CPE8[2] |
| 4 | - | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0<br>CPE3[4] | 90 | 180 | 270<br>CPE10[8] |
| 1 | 0<br>CPE2[8] | 90<br>CPE1[6]<br>CPE4[2] | 180<br>CPE5[6] | 270<br>CPE7[8] |
| 2 | 0<br>CPE1[8] | 90<br>CPE3[8] | 180<br>CPE7[2] | 270 |
| 3 | 0<br>CPE10[2] | 90 | 180<br>CPE4[4] | 270<br>CPE8[2] |
| 4 | - | - | - | - |
| 5 | - | - | - | - |
| 6 | - | - | - | - |
| 7 | - | - | - | - |

| Timeslot | Phase adjustment (degrees) | | | |
|---|---|---|---|---|
| | 0 | 90 | 180 | 270 |
| 0 | CPE3[4] | | | CPE10[8] |
| 1 | 0<br>CPE2[8] | 90<br>CPE1[6]<br>CPE4[2] | 180<br>CPE5[6] | 270<br>CPE7[8] |
| 2 | 0<br>CPE1[8] | 90<br>CPE3[8] | 180<br>CPE7[2]<br>CPE6[2] | 270 |
| 3 | 0<br>CPE10[2] | 90 | 180<br>CPE4[4]<br>CPE6[4] | 270<br>CPE8[2] |
| 4 | - | - | - | - |
| 5 | - | - | - | - |
| 6 | - | - | - | - |
| 7 | - | - | - | - |

| Timeslot | Phase adjustment (degrees) | | | |
|---|---|---|---|---|
| | 0 | 90 | 180 | 270 |
| 0 | CPE3[4] | | | CPE10[8] |
| 1 | 0<br>CPE2[8] | 90<br>CPE1[6]<br>CPE4[2] | 180<br>CPE5[6] | 270<br>CPE7[8] |
| 2 | 0<br>CPE1[8] | 90<br>CPE3[8] | 180<br>CPE7[2]<br>CPE6[2] | 270<br>CPE9[6] |
| 3 | 0<br>CPE10[2] | 90 | 180<br>CPE4[4]<br>CPE6[4] | 270<br>CPE8[2] |
| 4 | - | - | - | - |
| 5 | - | - | - | - |
| 6 | - | - | - | - |
| 7 | - | - | - | - |

FIG. 32

| Binary value | Quantized Phase Difference | Range of phase differences that map to this zone | Zone Name |
|---|---|---|---|
| 000 | 337.5° | 315° to 360°(0°) | 0° Zone Low Side |
| 001 | 22.5° | 0° to 45° | 0° Zone High Side |
| 010 | 67.5° | 45° to 90° | 90° Zone Low Side |
| 011 | 112.5° | 90° to 135° | 90° Zone High Side |
| 100 | 157.5° | 135° to 180° | 180° Zone Low Side |
| 101 | 202.5° | 180° to 225° | 180° Zone High Side |
| 110 | 247.5° | 225° to 270° | 270° Zone Low Side |
| 111 | 292.5° | 270° to 315° | 270° Zone High Side |

| CPE ID | # Blocks to transmit | Phase Difference Zone | Phase Adjustment for best signal | 2nd best phase adjustment | 3rd best phase adjustment | Optimal Phase Adjustement (in degrees) to reduce interference level and priority for interference reduction | | |
|---|---|---|---|---|---|---|---|---|
| | | | BTS A | | | BTS B | BTS C | BTS D |
| 1 | 14 | 0 high side | 0 | 90 | 270 | 180 1 | 180 2 | 180 4 |
| 2 | 8 | 0 low side | 0 | 270 | 90 | 270 4 | 0 4 | 90 1 |
| 3 | 12 | 90 low side | 90 | 0 | 180 | 90 2 | 0 1 | 0 3 |
| 4 | 6 | 90 high side | 90 | 180 | 0 | 180 4 | 180 3 | 0 2 |
| 5 | 6 | 180 high side | 180 | 270 | 90 | 270 1 | 270 2 | 180 3 |
| 6 | 6 | 180 high side | 180 | 270 | 90 | 0 3 | 270 4 | 0 3 |
| 7 | 10 | 270 low side | 270 | 180 | 0 | 0 2 | 90 2 | 90 2 |
| 8 | 2 | 270 high side | 270 | 0 | 180 | 90 2 | 0 1 | 180 3 |
| 9 | 6 | 270 low side | 270 | 180 | 0 | 180 4 | 180 4 | 270 4 |
| 10 | 22 | 270 high side | 270 | 0 | 180 | 270 1 | 90 2 | 90 4 |
| Total | 92 | | | | | | | |

*FIG. 41*

| Timeslot | Phase adjustment (degrees) | | | |
|---|---|---|---|---|
| 0 | 0 | 90 | 180 | 270 |
| 1 | 0 | 90 | 180 | 270 |
| 2 | 0 | 90 | 180 | 270 |
| 3 | 0 | 90 | 180 | 270 |
| 4 | - | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0 | 90 | 180 | 270 CPE10[8] |
| 1 | 0 | 90 CPE1[6] | 180 CPE5[6] CPE10[2] | 270 |
| 2 | 0 CPE1[8] | 90 | 180 | 270 |
| 3 | 0 CPE10[8] | 90 | 180 | 270 |
| 4 | 270 CPE10[4] | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0 CPE3[4] | 90 | 180 | 270 CPE10[8] |
| 1 | 0 | 90 CPE1[6] | 180 CPE5[6] CPE10[2] | 270 |
| 2 | 0 CPE1[8] | 90 CPE3[8] | 180 | 270 |
| 3 | 0 CPE10[8] | 90 | 180 | 270 CPE8[2] |
| 4 | 270 CPE10[4] | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0 CPE3[4] | 90 | 180 | 270 CPE10[8] |
| 1 | 0 CPE2[8] | 90 CPE1[6] | 180 CPE5[6] CPE10[2] | 270 |
| 2 | 0 CPE1[8] | 90 CPE3[8] | 180 | 270 |
| 3 | 0 CPE10[8] | 90 | 180 | 270 CPE8[2] |
| 4 | 270 CPE10[4] | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0<br>CPE3[4] | 90 | 180 | 270<br>CPE10[8] |
| 1 | 0<br>CPE2[8] | 90<br>CPE1[6] | 180<br>CPE5[6]<br>CPE10[2] | 270<br>CPE7[8] |
| 2 | 0<br>CPE1[8] | 90<br>CPE3[8] | 180<br>CPE7[2] | 270 |
| 3 | 0<br>CPE10[8] | 90 | 180 | 270<br>CPE8[2] |
| 4 | 270<br>CPE10[4] | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0<br>CPE3[4] | 90 | 180 | 270<br>CPE10[8] |
| 1 | 0<br>CPE2[8] | 90<br>CPE1[6]<br>CPE4[2] | 180<br>CPE5[6]<br>CPE10[2] | 270<br>CPE7[8] |
| 2 | 0<br>CPE1[8] | 90<br>CPE3[8] | 180<br>CPE7[2] | 270 |
| 3 | 0<br>CPE10[8] | 90 | 180<br>CPE4[4] | 270<br>CPE8[2] |
| 4 | 270<br>CPE10[4] | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0<br>CPE3[4] | 90 | 180 | 270<br>CPE10[8] |
| 1 | 0<br>CPE2[8] | 90<br>CPE1[6]<br>CPE4[2] | 180<br>CPE5[6]<br>CPE10[2] | 270<br>CPE7[8] |
| 2 | 0<br>CPE1[8] | 90<br>CPE3[8] | 180<br>CPE7[2]<br>CPE6[2] | 270 |
| 3 | 0<br>CPE10[8] | 90 | 180<br>CPE4[4]<br>CPE6[4] | 270<br>CPE8[2] |
| 4 | 270<br>CPE10[4] | - | - | - |
| 5 | - | - | - | - |
| 6 | - | - | - | - |
| 7 | - | - | - | - |

| Timeslot | Phase adjustment (degrees) | | | |
|---|---|---|---|---|
| 0 | 0<br>CPE3[4] | 90 | 180 | 270<br>CPE10[8] |
| 1 | 0<br>CPE2[8] | 90<br>CPE1[6]<br>CPE4[2] | 180<br>CPE5[6]<br>CPE10[2] | 270<br>CPE7[8] |
| 2 | 0<br>CPE1[8] | 90<br>CPE3[8] | 180<br>CPE7[2]<br>CPE6[2] | 270<br>CPE9[6] |
| 3 | 0<br>CPE10[8] | 90 | 180<br>CPE4[4]<br>CPE6[4] | 270<br>CPE8[2] |
| 4 | 270<br>CPE10[4] | - | - | - |
| 5 | - | - | - | - |
| 6 | - | - | - | - |
| 7 | - | - | - | - |

*FIG. 49*

SCHEDULING OF BEAMFORMED DATA TO REDUCE INTERFERENCE

CROSS REFERENCE TO RELATED APPLICATIONS

The present application claims the benefit of U.S. Provisional Application No. 61/362,659, filed Jul. 8, 2010, and is related to U.S. Provisional Application No. 61/329,504, filed Apr. 29, 2010, which is incorporated herein by reference. Both these applications are incorporated by reference for all purposes.

BACKGROUND OF THE INVENTION

The present invention generally relates to systems and methods for coordinating the scheduling of beamformed data to reduce interference. Transmissions from a base station can be scheduled according to a variety of factors, including the level of interference from adjacent base stations, a priority of reducing interference, and the relative phase differences of adjacent base stations, leading to lower interference levels and to generally higher network efficiency.

Wireless communications systems can use transmit beamforming to improve the level of the signal seen at a desired receiver, as well as to reduce the levels of interference seen at other receivers. The interference reduction capability of beamforming can be advantageous in cellular wireless systems, where high levels of interference can severely reduce the capacity of such systems.

Beamforming generally refers to techniques used in wireless communications systems such as radio frequency, optical frequency or acoustic frequency systems wherein signals transmitted or received by multiple transmit or receive sensors are combined in such as way as to improve their overall gain, or carrier to interference ratio. Beamforming uses at least two transmit or receive sensors.

Beamforming has typically been used in cellular wireless communications systems to improve the range over which a mobile device can communicate with the base station. An additional possibility with beamforming is the ability to reduce interference by choosing phases and signal amplitudes that can cause the signals, received at or transmitted by a different mobile station, to cancel.

Beamforming typically employs multiple antennas at the base station and uses signal processing techniques to ensure that the phases of the signals are aligned with each other by the time that they reach the mobile device. In systems that use Time Division Duplexing (TDD), where the same set of frequencies are used for both downlink (base station to mobile station) and uplink (mobile station to base station) transmissions, the base station can take advantage of the channel reciprocity to adjust the amplitudes and phases of the transmissions at each antenna. For Frequency Division Duplexing (FDD) systems, where different frequencies are used for the downlink and uplink transmissions, feedback from the mobile station to the base station about the amplitudes and phases of the signals received at the mobile station is generally required.

Cellular wireless beamforming systems typically use two to eight antennas. Since the cost of supporting beamforming in a base station product increases as the number of antennas increase, systems with more than eight antennas have generally been regarded as being cost prohibitive.

FIG. 1 illustrates a wireless beamforming system 100 that uses two transmit antennas at a base station to communicate with a mobile station 108 in accordance with an embodiment of the invention. Signal processing algorithms at the base station 102 choose the appropriate phases and amplitudes of the signals 104 and 106 at each of the base station transmit antennas to ensure that the combined signal received at the mobile station 108 has sufficient power to operate correctly.

FIGS. 2-5 show some examples of how the phase and amplitude differences between the two signals 104 and 106 arriving at a mobile device (e.g., 108), or a customer premise equipment (CPE), can impact the combined signal that the receiver sees. A beamforming system (e.g., 100) can control the relative amplitudes and phases at the transmitter so that the combined signal seen at the receiver (e.g., 108) can have increased amplitude, or can have reduced amplitude.

FIGS. 2A and 2B illustrate plots 202 and 204, respectively, where two sinusoidal signals of equal power with phase differences of 0° and 180° are being received at a mobile device (e.g., 108) in accordance with an embodiment of the present invention. In the first plot 202, the two signals 104 and 106 are perfectly aligned with each other in phase. The combined signal (marked with triangles) has twice the amplitude of the individual signals. Referring to FIG. 2B, in the second plot 204, the two signals are 180° out of phase with each other. In this case, the signals cancel each other out perfectly, resulting in a combined signal that has zero amplitude. The receiver (e.g., 108) in this case does not detect any signal due to the perfect cancellation of the signals through destructive interference.

FIGS. 3A and 3B illustrate plots 302 and 304, respectively, where two sinusoidal signals of unequal power with phase differences of 0° and 180° are being received at a mobile device (e.g., 108) in accordance with an embodiment of the present invention. In this example, the two signals are not equal in power but rather the first signal 104 is 3 dB stronger than the second signal 106. Referring to FIG. 3A, the first plot 302 depicts the two signals 104 and 106 perfectly aligned with each other in phase, resulting in a much stronger received combined signal. The second plot 304 shows the scenario where the two signals 104 and 106 are 180° out of phase with each other. In this scenario, the signals do not completely cancel each other out, but the combined signal at the receiver is still attenuated significantly when compared with the case of the two separate signals being aligned perfectly with each other (e.g., in plots 202 and 302 of FIGS. 2A and 3A, respectively).

It is not necessary that the signals arriving at the receiver be aligned exactly in phase in order for a combining gain in signal strength to be achieved. Likewise, it is not necessary that the signals be exactly 180° out of phase with each other to realize a signal cancellation. Thus, FIGS. 4A and 4B illustrate plots 402 and 404, respectively, where two sinusoidal signals of unequal power with phase differences of 45° and 160° are being received at a mobile device (e.g., 108) in accordance with an embodiment of the present invention FIGS. 4A and 4B, respectively, show the same two signals (e.g., signals 104 and 106) with the same 3 dB power difference as in FIGS. 3A and 3B, but this time the phase differences at the receiver (e.g., 108) are 45° and 160°. In the scenario, where the signals are received with a 45° phase difference (i.e., in plot 402), the combined signal at the receiver still shows significant gain and is not much reduced when compared to the scenario where the signals are received with a 0° phase difference, as shown in plot 302 of FIG. 3A. Similarly, when the original signals are received 160° out of phase with each other (as depicted in plot 404), there is still a significant reduction in the level of the combined signal when compared to the scenario where the signals are received with a 180° phase difference shown, as shown in plot 304 of FIG. 3B.

FIG. 5 illustrates a plot 500 of the power gain of the combined signals, also known as the beamforming gain, versus the phase difference of two signals (e.g., signals 104 and 106) at a receiver (e.g., 108) in accordance with an embodiment of the present invention. Note that the plot 500 assumes that both signals are received with equal amplitude, similar to the signals depicted in FIGS. 2A and 2B. The beamforming gain is relative to a signal sent at a nominal level of 0 dB from one of the transmit antennas. The largest gain (6 dB) is seen when the two signals are perfectly aligned in phase (e.g., as in plot 202), while the lowest gain (in this case negative ∞ when expressed in dB) is seen when the signals have a phase difference of 180° (e.g., as in plot 204).

Modern wireless communication networks include many different network topologies comprising heterogeneous mixtures of macrocell, microcell, picocell, and femtocell resources. At the highest level of wireless coverage, a macrocell provides cellular service for a relatively large physical area, often in areas where network traffic densities are low. In more dense traffic areas, a macrocell may act as an overarching service provider, primarily responsible for providing continuity for service area gaps between smaller network cells. In areas of increased traffic density, microcells are often utilized to add network capacity and to improve signal quality for smaller physical areas where increased bandwidth is required. Numerous picocells and femtocells generally add to network capacity for even smaller physical areas in highly populated metropolitan and residential regions of a larger data communications network.

This mixture of larger and smaller cells can reduce periods of network congestion created by traditional network architecture which previously bottlenecked a majority of regional subscriber communications through a small number of larger network cells (e.g., macrocells or microcells). This congestion reducing technique can improve a service provider network's Quality of Service (QOS) as well as network service subscribers' collective Quality of Experience (QOE) within a particular portion of a data communications network. Negative effects associated with poor QOS and poor QOE (e.g., conditions largely caused by congestion and/or interference), which can be mitigated by adding a substantial number of short-range wireless base station devices to network infrastructure, may include: queuing delay, data loss, as well as blocking of new and existing network connections for certain network subscribers.

As the number of overlapping cells in a network increases (i.e., the number of macrocells, microcells, picocells, and femtocells in a network), it becomes increasingly important to manage the airlink resources shared by the components in a network. By way of example, resources such as frequency channels, timeslots, and spreading codes need to be managed for each cell in a network, and poor management can result in increased interference and a decrease in overall network efficiency.

Conventional systems have attempted to use beamforming techniques to manage a transmission from a base station to an intended mobile device to increase the signal strength similar to the techniques described in plots 202, 302, and 402. Some conventional systems have attempted to reduce undesired interference levels using beamforming signal cancellation techniques similar to the techniques described in plots 204, 304, and 404. However, these systems require relatively complex signal processing algorithms and communications between base stations to achieve the interference reductions.

Thus, it would be desirable to schedule transmissions in a wireless network such that the signals received by a mobile device from a serving base station combine in a constructive manner at the mobile receiver, while signals arriving at a mobile base station from non-serving base stations combine in a destructive manner at the mobile receiver. Additionally, it would be desirable for the scheduling to be minimally resource-intensive so that complex scheduling can be easily performed.

SUMMARY OF THE INVENTION

The present invention generally relates to systems and methods for coordinating the scheduling of beamformed data to reduce interference. A customer premise equipment (CPE) uses a plurality of bits to quantize the phase angle of the beamformed data received by the CPE and reports it to its serving base station. The serving base station selects one of the phase adjustment angles based on the bits received from the CPE in order to schedule the data transmission to the CPE. The phase adjustment angles are in "n" degree steps. In an embodiment, two bits are used to quantize the phase angle reported by CPEs to their serving base stations and four phase adjustments angles (i.e., in 90 degree steps) are used. The two bit allows the phase zones to be quantized into four different levels. Each phase angle adjustment is mapped to a single phase angle difference.

In an embodiment, three bits are used to quantize the phase angle reported by CPEs to their serving base stations and four phase adjustments angles (i.e., in 90 degree steps) are used. The three bits allow the phase zones to be quantized into eight different levels instead of four. Each phase angle adjustment is mapped to two phase angle differences. The additional quantization bit is used to differentiate between the second most optimal phase angle correction and the third most optimal phase angle correction.

In an embodiment, a computer implemented method for transmitting beamformed data to a mobile station includes receiving a quantized phase angle information of a reference signal from a mobile station at a first base station that transmitted the reference signal to the mobile station. A first phase adjustment angle is selected based on the quantized phase angle information received from the mobile station. A first beamformed signal that is provided with the first phase adjustment angle based on the received quantized phase angle information is transmitted to the mobile station from the first base station. The reference signal may or may not be a beamformed signal.

In an embodiment, the first base station is a serving base station for the mobile station, and the mobile station is receiving an interference signal from a second base station. The interference signal may or may not be a beamformed signal. The first beamformed signal is transmitted to the mobile station by the first base station as part of a first data package. The first data package in a first wireless resource is scheduled with the first phase adjustment at the first base station in coordination with an associated second phase adjustment of a second wireless resource at the second base station.

In an embodiment, a computer implemented method for receiving beamformed data from a base station includes receiving a first signal from a first base station at a mobile station. A first phase difference of the first signal is measured at the mobile station. A quantized phase angle information of the first signal is transmitted by a mobile station to a first base station that transmitted the first signal to the mobile station. A first beamformed signal that is provided with a first phase adjustment angle is received from the first base station. The first phase adjustment angle is selected by the first base station based on the quantized phase angle information transmitted by the mobile station. The first signal may or may not be a beamformed signal.

In another embodiment, a wireless communication system is provided at a base station for coordinating the scheduling of beamformed data to reduce interference. The system includes a processor; a receiver; and a transmitter. The system is configured to: transmit a first signal to a mobile station, receive a quantized phase angle information of the first signal from the mobile station, select a first phase adjustment angle based on the received quantized phase angle information from the mobile station, and transmit a first beamformed signal that is provided with the first phase adjustment angle based on the received quantized phase angle information to the mobile station. The first signal may or may not be a beamformed signal.

In yet another embodiment, a wireless communication system for coordinating the scheduling of beamformed data to reduce interference includes a first base station; a second base station; a data communication network facilitating data communication amongst the first base station and the second base station; and a first mobile station. A first beamformed signal received by the first mobile station from the first base station is received as a communication. A second beamformed signal received by the first mobile station from the second base station is received as interference. The system is configured to: transmit a first signal to a mobile station, receive a quantized phase angle information of the first signal from the mobile station, select a first phase adjustment angle based on the received quantized phase angle information from the mobile station, and transmit a first beamformed signal that is provided with the first phase adjustment angle based on the received quantized phase angle information to the mobile station. The first signal may or may not be a beamformed signal.

The present invention may further include a computer readable medium encoded with computer-executable instructions for coordinating beamformed data for wireless transmission, which when executed, performs a method comprising: scheduling a first data package in a first wireless resource with a first phase adjustment at a first base station in coordination with an associated second phase adjustment of a second wireless resource at a second base station; and transmitting the first data package as a first beamformed signal to a first mobile station.

BRIEF DESCRIPTION OF THE DRAWINGS

Embodiments of the present invention are described in detail below by way of example and with reference to the accompanying drawings, in which:

FIG. 12 illustrates a table mapping a binary value to a quantized phase difference in accordance with an embodiment of the present invention;

FIG. 14 illustrates a table showing the average gain of the combined signals in FIG. 13 relative to the signal transmitted from one of the antennas for each of the quantized phase zones in accordance with an embodiment of the present invention;

FIG. 16 illustrates a table showing the average gain of the combined signals in FIG. 15 relative to the signal transmitted from one of the antennas for each of the quantized phase zones in accordance with an embodiment of the present invention;

FIG. 18 illustrates a table showing the average gain of the combined signals in FIG. 17 relative to the signal transmitted from one of the antennas for each of the quantized phase zones in accordance with an embodiment of the present invention;

FIG. 20 illustrates a phase adjustment map in accordance with an embodiment of the present invention;

FIG. 21 illustrates the frequency resources used at a base station in accordance with an embodiment of the present invention;

FIG. 22 illustrates a CPE phase management table at base station A with various mobile station transmissions and interference data in accordance with an embodiment of the present invention;

FIG. 25 illustrates an empty transmission schedule at a base station A in accordance with an embodiment of the present invention;

FIG. 26 illustrates a transmission schedule after addressing first-priority interference from base station B in accordance with an embodiment of the present invention;

FIG. 27 illustrates a transmission schedule after addressing first-priority interference from base station C in accordance with an embodiment of the present invention;

FIG. 28 illustrates a transmission schedule after addressing first-priority interference from base station D in accordance with an embodiment of the present invention FIG. 29 illustrates a transmission schedule after addressing second-priority interference from base station B in accordance with an embodiment of the present invention;

FIG. 30 illustrates a transmission schedule after addressing second-priority interference from base station D in accordance with an embodiment of the present invention;

FIG. 31 illustrates a transmission schedule after addressing third-priority interference in accordance with an embodiment of the present invention;

FIG. 32 illustrates a transmission schedule after addressing fourth-priority interference in accordance with an embodiment of the present invention;

FIGS. 41-49 illustrate an example of how data transmissions among multiple base stations can be scheduled such that the interference to adjacent base station sectors is reduced, by coordinating the adjustment of relative phases of the transmitted signals at each base station according to an embodiment of the present invention.

DESCRIPTION OF EMBODIMENTS

The present invention generally relates to systems and methods for coordinating the scheduling of beamformed data to reduce interference. The levels of interference in a cellular wireless system are reduced by coordinating the transmissions from each base station in the system so that the level of interference at the subscriber devices is reduced. A customer premise equipment (CPE) uses a plurality of bits to quantize the phase angle of the beamformed data received by CPE and reports it to its serving base station. The serving base station selects one of the phase adjustment angles based on the bits received from the CPE in order to schedule the data transmission to the CPE. The phase adjustment angles are in "n" degree steps. In an embodiment, two bits are used to quantize the phase angle reported by CPEs to their serving base stations and four phase adjustments angles (i.e., in 90 degree steps) are used. The two bit allows the phase zones to be quantized into four different levels. Each phase angle adjustment is mapped to a single phase angle difference.

In another embodiment, three bits are used to quantize the phase angle reported by CPEs to their serving base stations and four phase adjustments angles (i.e., in 90 degree steps) are used. The three bit allows the phase zones to be quantized into eight different levels instead of four. Each phase angle adjustment is mapped to two phase angle differences. The additional quantization bit is used to differentiate between the second most optimal phase angle correction and the third most optimal phase angle correction.

Figure 6:
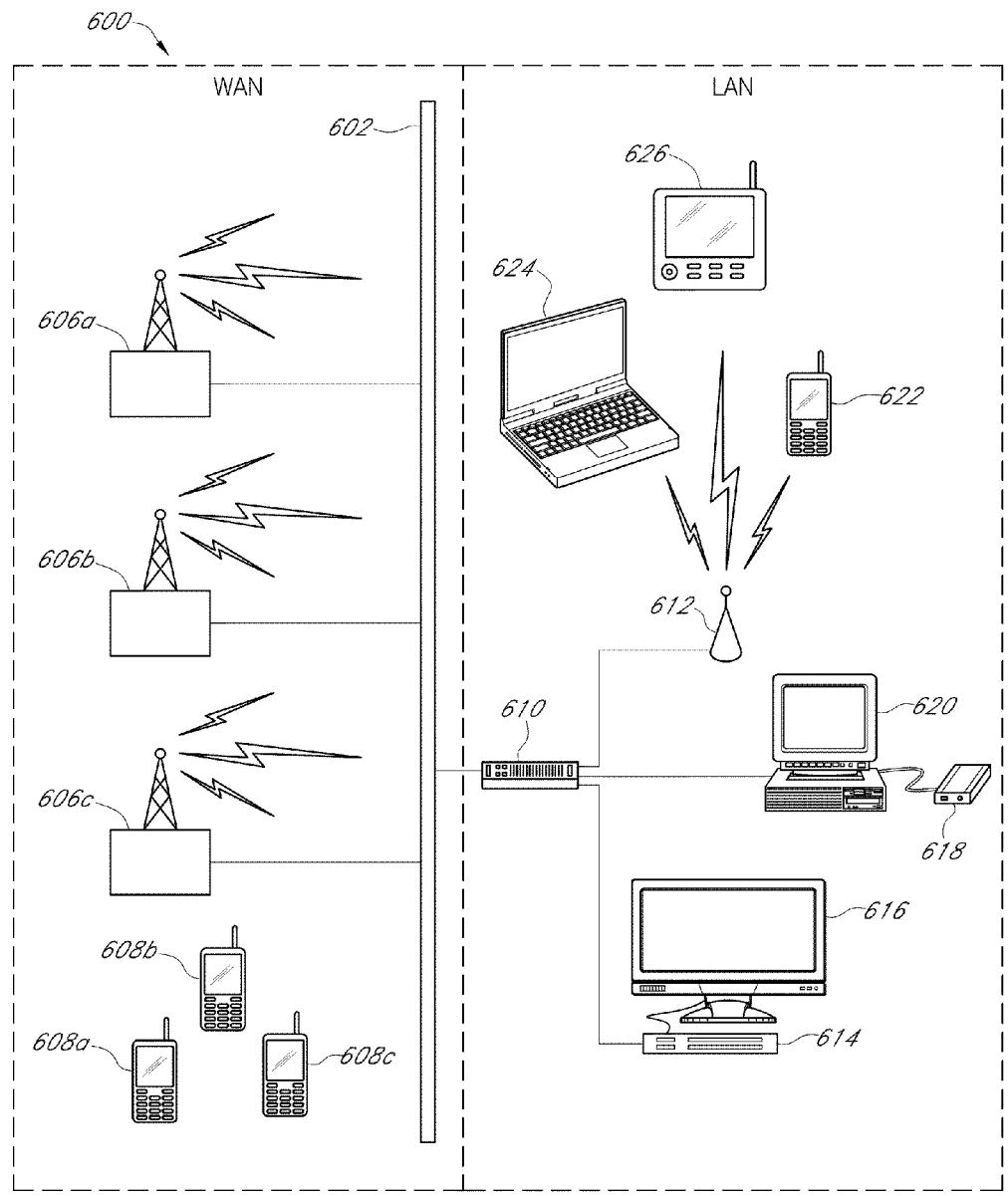
FIG. 6 illustrates a distributed data communications system in accordance with an embodiment of the present invention.

FIG. 6 illustrates a networked computing system 600 including various wireline and wireless computing devices that may be utilized to implement any of the scheduling coordination processes associated with various embodiments of the present invention. The networked computing system 600 may include, but is not limited to, a group of remote base station devices 606a-c, any one of which may be associated with a macrocell, a microcell, or a picocell base station that may each be a neighboring base station to one or more short-range base station devices 612 (e.g., a femtocell or a picocell device) within a particular region of the networked computing system 600; a data communications network 602, including both Wide Area Network (WAN) and Local Area Network (LAN) portions; a variety of wireless user equipment, including: cellular phone or PDA devices 608a-c, 622, a laptop or netbook computer 624, an electronic book device 626, along with any other common portable wireless computing devices well known in the art (e.g., handheld gaming units, personal music players, video recorders, etc.) that are capable of communicating with the data communications network 602 utilizing one or more of the remote base stations 606a-c, the short-range base station device 612, or any other common wireless or wireline network communications technology; one or more network gateways or switch devices 610 that can facilitate data communications processes within the LAN and between the LAN and the WAN of the data communications network 602; a television device 616 (e.g., a high definition LCD or Plasma television) that is optionally connected to a multi-media device 614 (e.g., a set-top box, digital video recorder (DVR), or Blu-Ray™ player device); and a desktop computer 620 optionally connected to an external hard-drive device 618.

Figure 1:
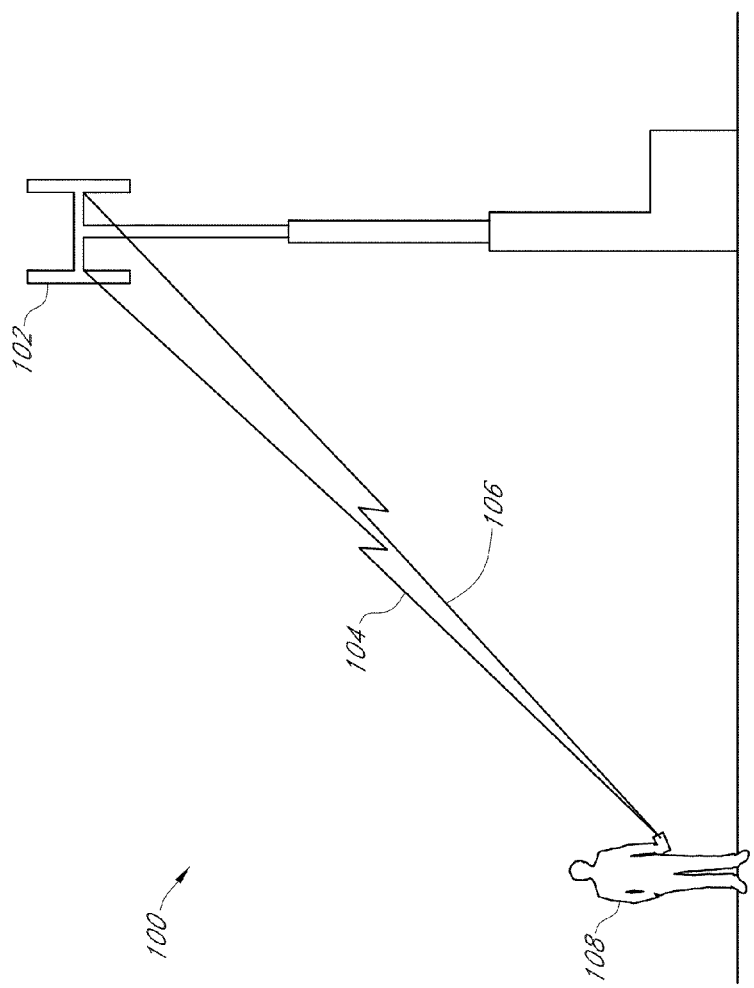
FIG. 1 illustrates a wireless beamforming system that uses two transmit antennas at a base station to communicate with a mobile station in accordance with an embodiment of the present invention.
Figure 2A:
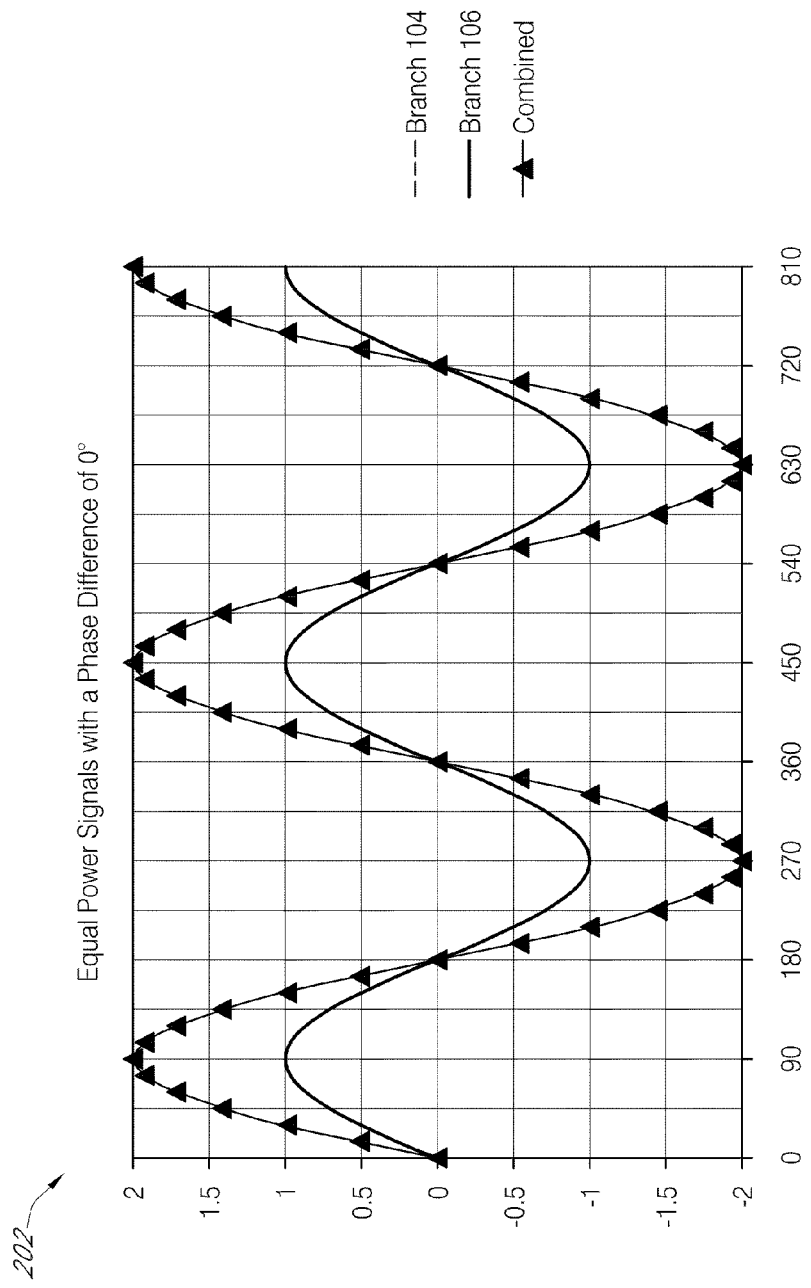
FIGS. 2A and 2B illustrate two sinusoidal signals of equal power with phase differences of 0° and 180° being received at a mobile device in accordance with an embodiment of the present invention.
Figure 2B:
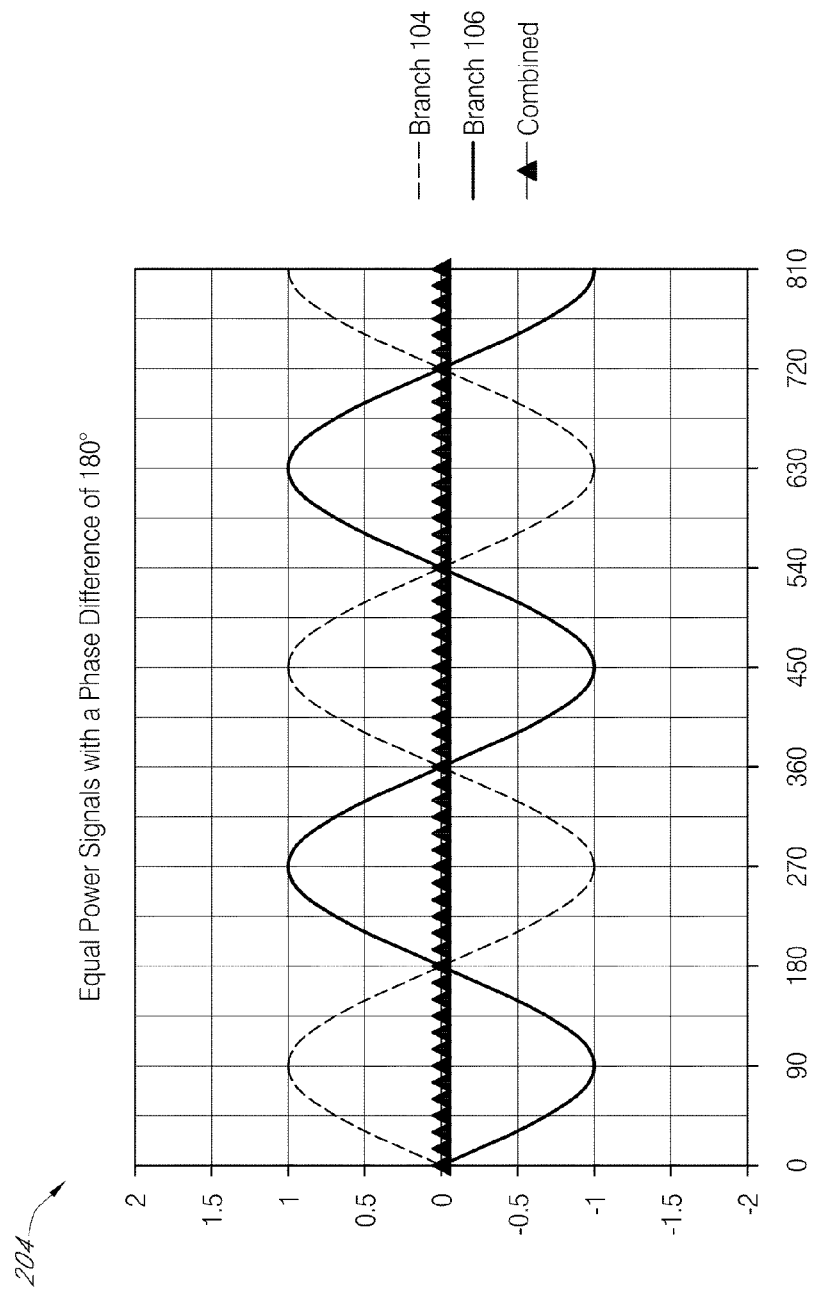
Figure 3A:
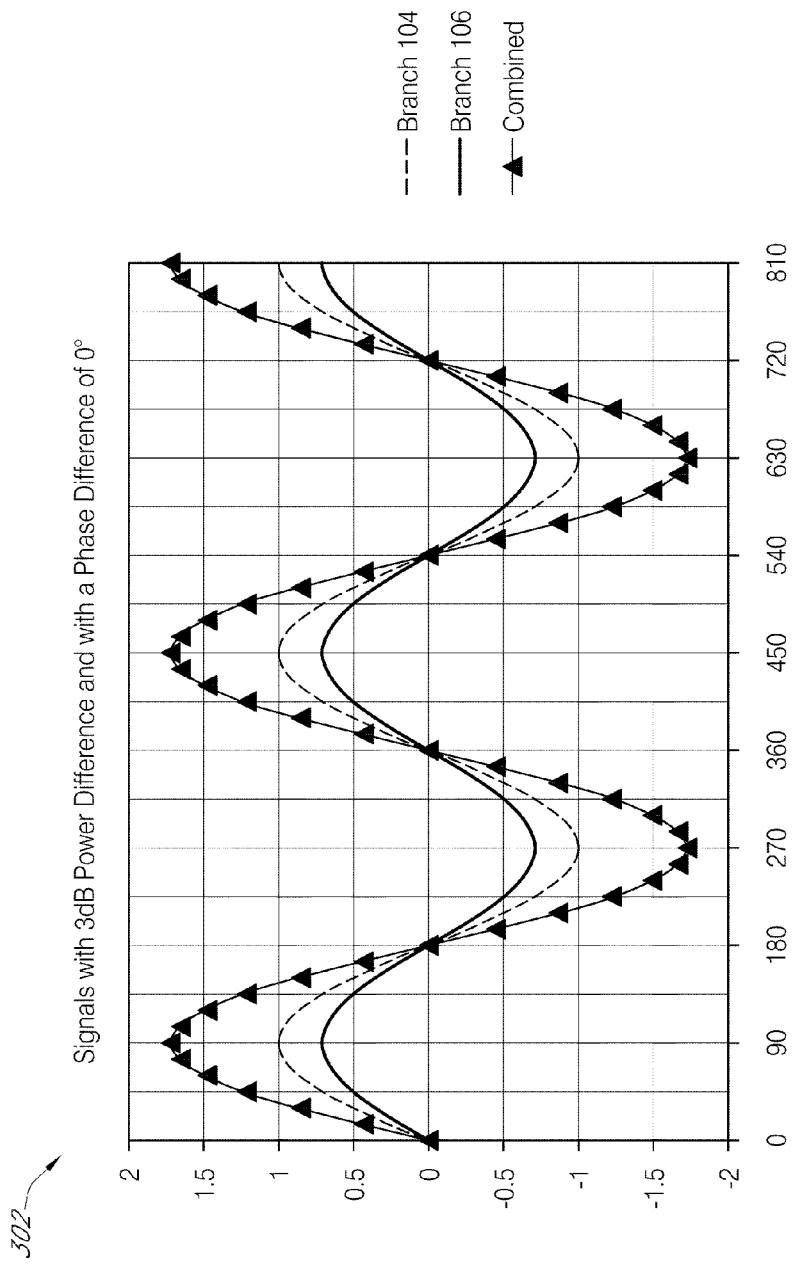
FIGS. 3A and 3B illustrate two sinusoidal signals of unequal power with phase differences of 0° and 180° being received at a mobile device in accordance with an embodiment of the present invention.
Figure 3B:
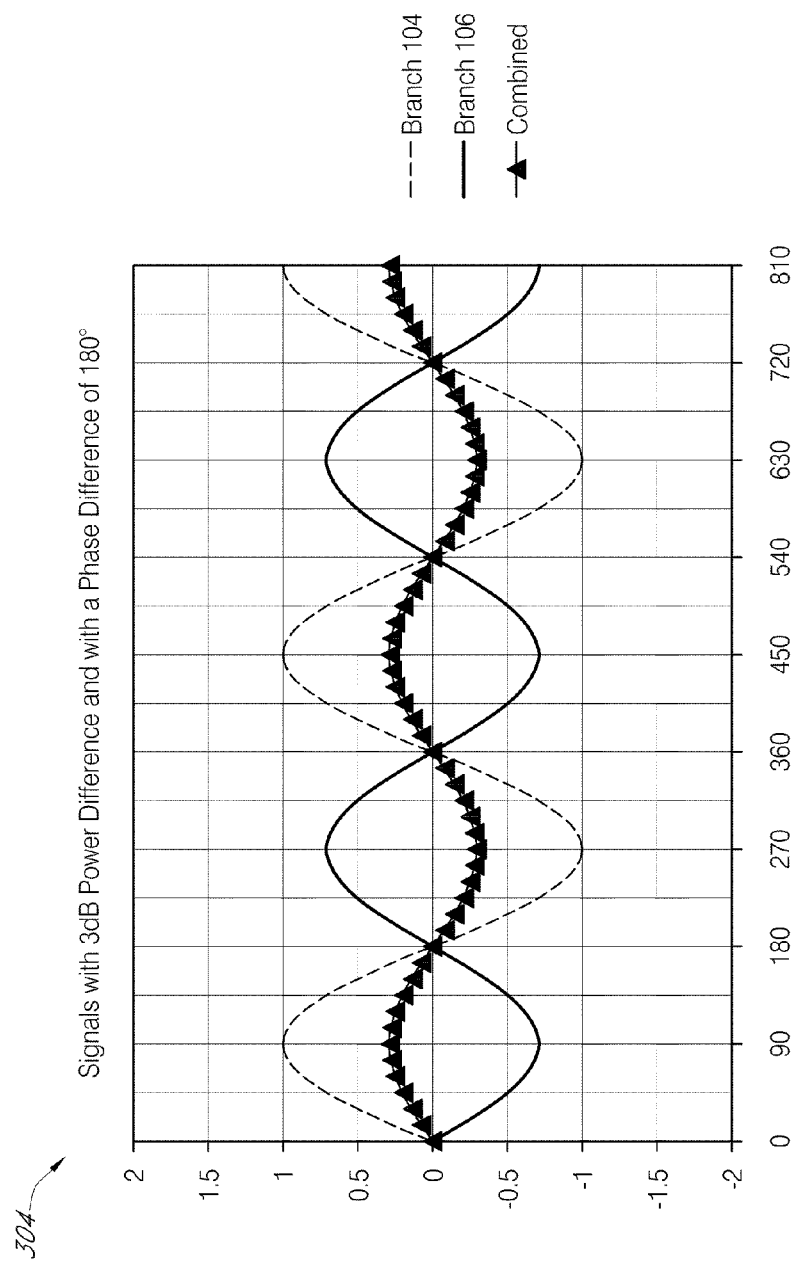
Figure 4A:
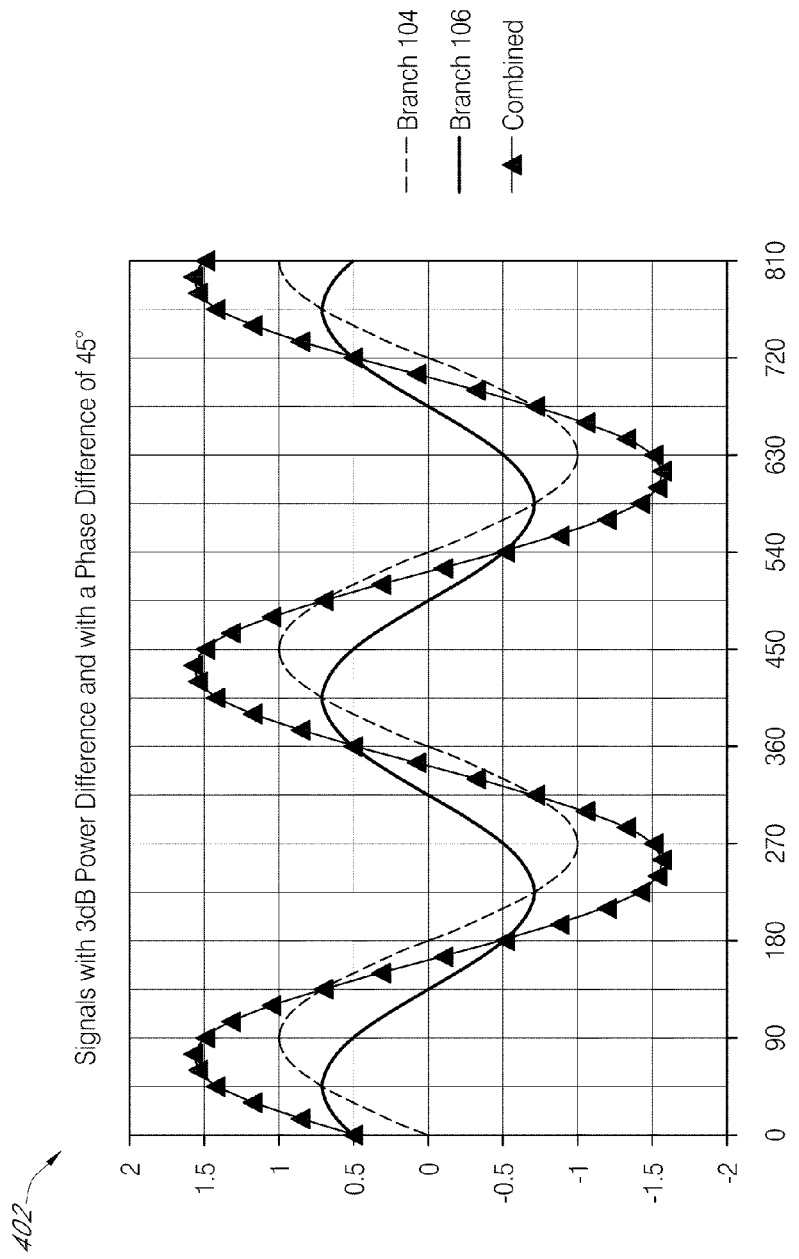
FIGS. 4A and 4B illustrate two sinusoidal signals of unequal power with phase differences of 45° and 160° being received at a mobile device in accordance with an embodiment of the present invention.
Figure 4B:
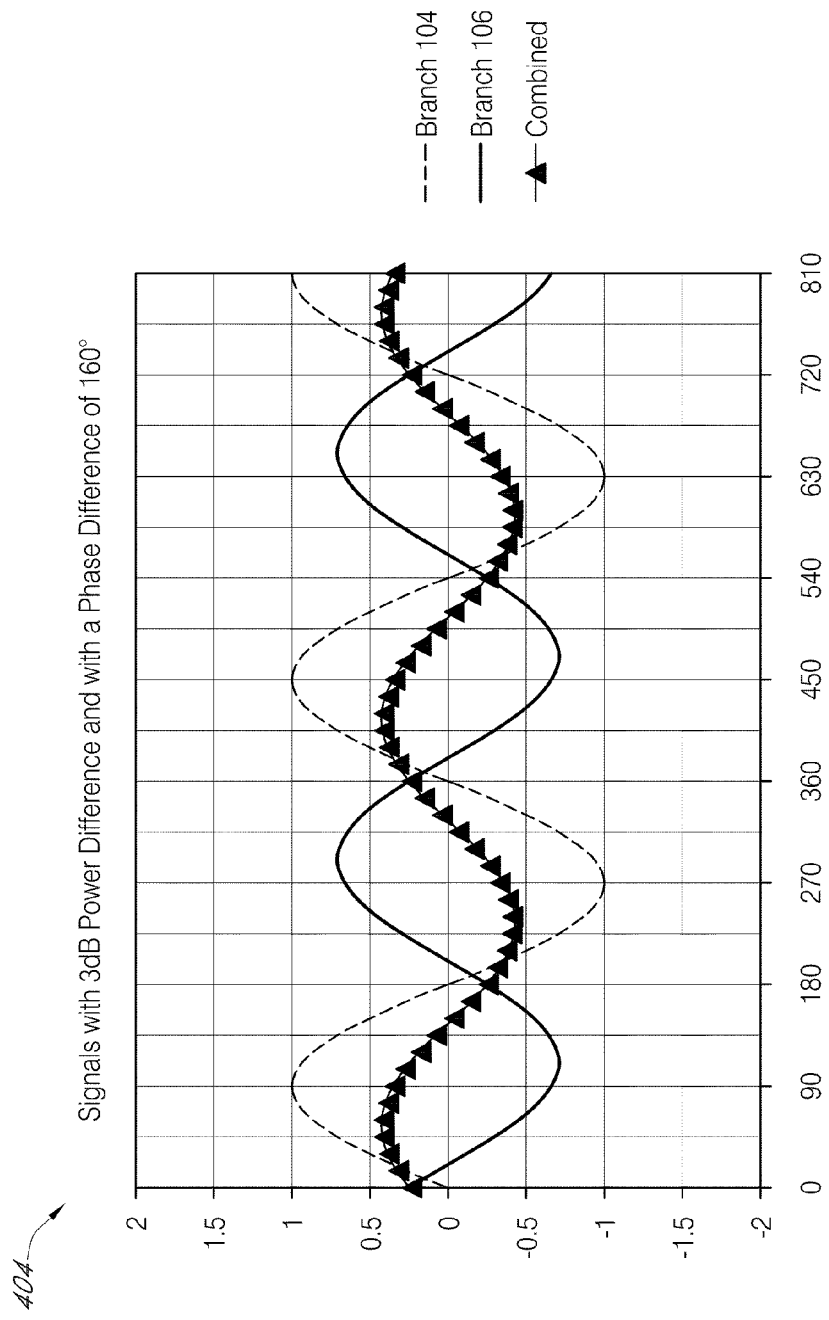
Figure 5:
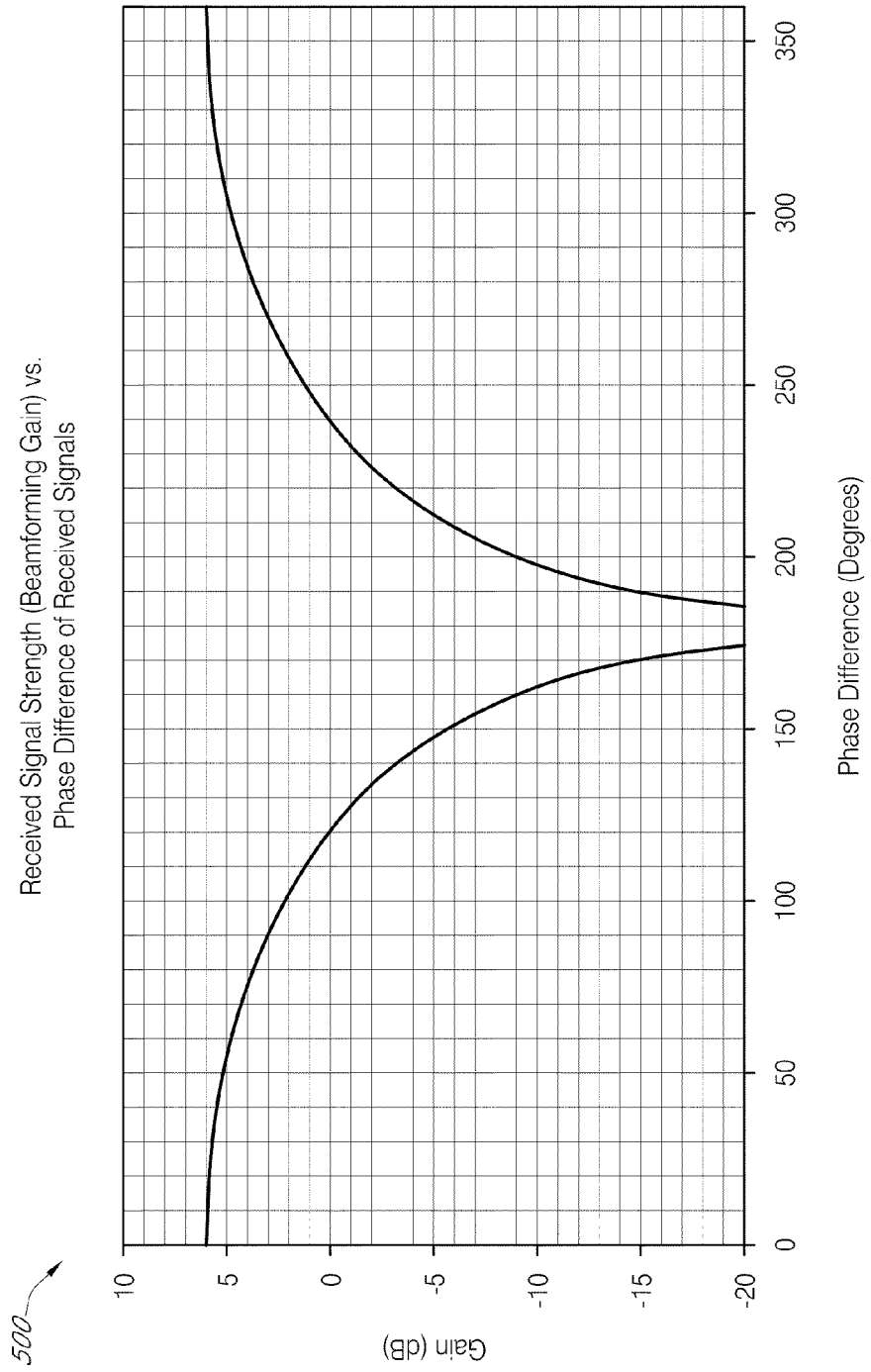
FIG. 5 illustrates a plot of the power gain of the combined signals, i.e. the beamforming gain, versus the phase difference of two signals at a receiver in accordance with an embodiment of the present invention.

In an embodiment, the remote base station devices 606a-c may represent individual base stations with a single antenna, individual base stations with an antenna array configured for transmitting beamformed transmissions, or a base station consisting of multiple sectors, each with a multi-antenna array. In addition, the remote base station devices 606a-c or the short-range base station device 612 may represent base station 102 of FIG. 1.

In an embodiment, the remote base station devices 606a-c, the short-range base station device 612 (e.g., a femtocell or a picocell device), or any of the user equipment (608a-c, 614, 616, 618, 620, 622, 624, or 626), may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, any of the remote base stations 606a-c may employ any number of common server, desktop, laptop, and personal computing devices.

In an embodiment, the user equipment (608a-c, 622, 624, or 626) may include any combination of common mobile computing devices (e.g., laptop computers, netbook computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-Fi™, etc. In addition, the user equipment (608a-c, 614, 616, 618, 620, 622, 624, or 626) may represent the receiver 108 of FIG. 1.

In an embodiment, either of the LAN or the WAN portions of the data communications network 602 of FIG. 6 may employ, but are not limited to, any of the following common communications technologies: optical fiber, coaxial cable, twisted pair cable, Ethernet cable, and powerline cable, along with any wireless communication technology known in the art. In an embodiment, any of the remote wireless base station 606a-c, the wireless user equipment (608a-c, 622, 624, or 626), as well as any of the other LAN connected computing devices (610, 614, 616, 618, or 620) may include any standard computing software and hardware necessary for processing, storing, and communicating data amongst each other within the networked computing system 600. The computing hardware realized by any of the network computing system 600 devices (606a-c, 608a-c, 610, 612, 614, 616, 620, 622, 624, or 626) may include, but is not limited to: one or more processors, volatile and non-volatile memories, user interfaces, transcoders, and wireline and/or wireless communications transceivers, etc.

In addition, any of the networked computing system 600 devices (606a-c, 608a-c, 610, 612, 614, 616, 620, 622, 624, or 626) may be configured to include one or more computer-readable media (e.g., any common volatile or non-volatile memory type) encoded with a set of computer readable instructions, which when executed, performs a portion of any of the short-range wireless communications optimization processes associated with various embodiments of the present invention.

Figure 7:
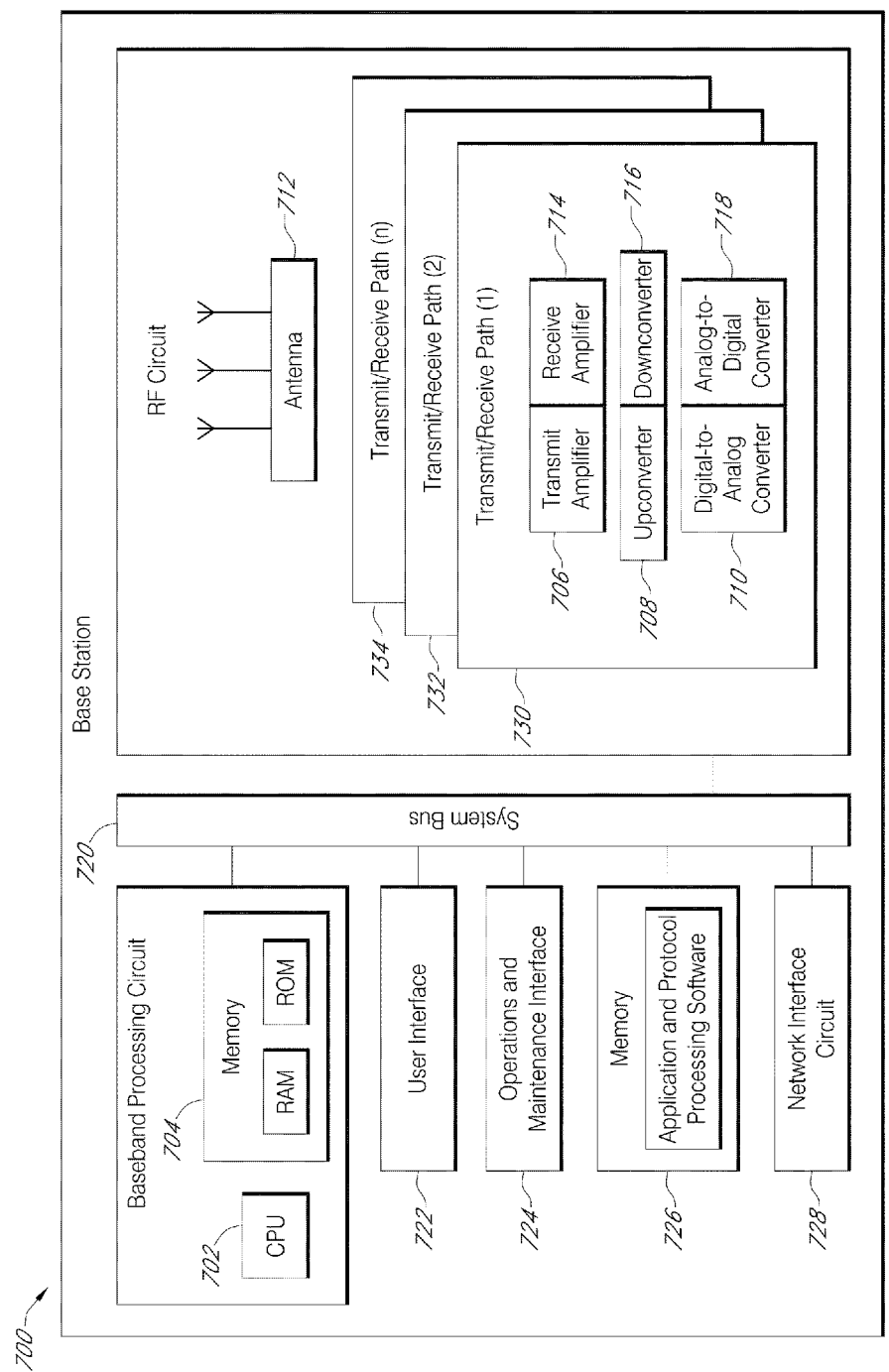
FIG. 7 illustrates a block diagram of a base station in accordance with an embodiment of the present invention.

FIG. 7 illustrates a block diagram of a base station device 700 (e.g., a femtocell, picocell, microcell or macrocell device) that may be representative of the base stations 606a-c and 612 in FIG. 6. In an embodiment of the present invention, the base station device 700 may include, but is not limited to, a baseband processing circuit including at least one central processing unit (CPU) 702. In an embodiment, the CPU 702 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 702 is responsible for executing all computer programs stored on the base station device's 700 volatile (RAM) and nonvolatile (ROM) system memories 704 and 726.

The base station device 700 may also include, but is not limited to, a radio frequency (RF) circuit for transmitting and receiving data to and from the network. The RF circuit may include, but is not limited to, a transmit path including a digital-to-analog converter 710 for converting digital signals from the system bus 720 into analog signals to be transmitted, an upconverter 708 for setting the frequency of the analog signal, and a transmit amplifier 706 for amplifying analog signals to be sent to the antenna 712 and transmitted as beamformed signals. In addition, the RF circuit may include, but is not limited to, a receive path including the receive amplifier 714 for amplifying any individual or beamformed signals received by the antenna 712, a downconverter 716 for reducing the frequency of the received signals, and an analog-to-digital converter 718 for outputting the received signals onto the system bus 720. The system bus 720 facilitates data communication amongst all the hardware resources of the base station device 700. There may be any number of transmit/receive paths 730, 732, and 734 comprising multiple digital-to-analog converters, upconverters, and transmit amplifiers as well as multiple analog-to-digital converters, downconverters, and receive amplifiers in order to transmit and receive as a beamforming base station. Additionally, antenna 712 may include multiple physical antennas for transmitting beamformed communications.

The base station device 700 may also include, but is not limited to, a user interface 722; an operations and maintenance interface 724; memory 726 storing application and protocol processing software; and a network interface circuit 728 facilitating communication across the LAN and/or WAN portions of the data communications network 602 (i.e., a backhaul network).

In an embodiment of the present invention, the base station 700 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 700 may be configured to communicate with the subscriber devices (e.g., 608a-c, 622, 624, and 626) via any Cellular Data Communications Protocol, including any common GSM, UMTS, WiMAX or LTE protocol.

Figure 8:
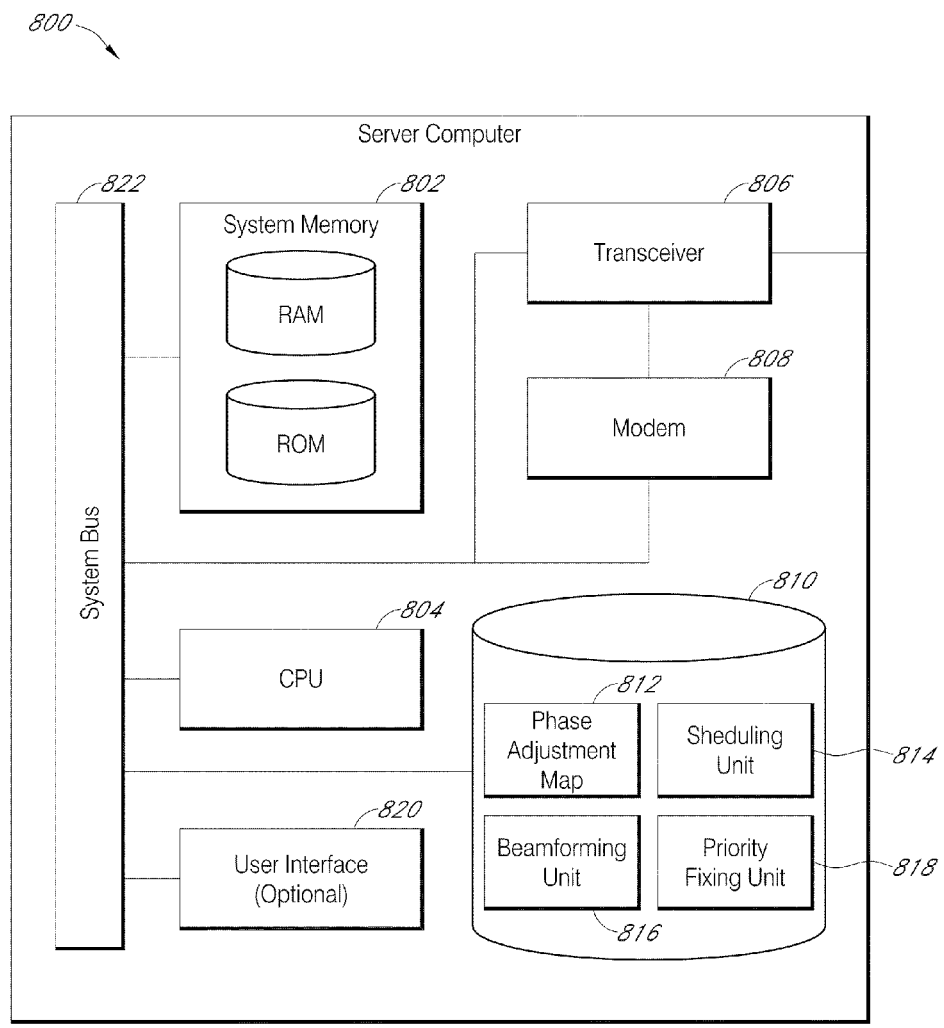
FIG. 8 illustrates a block diagram of a server computer in accordance with an embodiment of the present invention.

FIG. 8 illustrates a block diagram of a server computer 800 that may be representative of any of the remote service provider devices 606a-c or the base station 612 in FIG. 6, the base station 700 in FIG. 7, or any other common network device known in the art such as a router, gateway, or switch device. The server computer 800 may include, but is not limited to, one or more processor devices including a central processing unit (CPU) 804. In an embodiment, the CPU 804 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution. The CPU 804 is responsible for executing all computer programs stored on the server computer's 800 volatile (RAM), nonvolatile (ROM), and long-term storage system memories, 802 and 810.

The server computer 800 may also include, but is not limited to, an optional user interface 820 that allows a server administrator to interact with the server computer's 800 software and hardware resources and to display the performance and operation of the networked computing system 600; a software/database repository 810 including: a phase adjustment map 812 (e.g., statically or dynamically created phase adjustment map 2000 in FIG. 20) that may include a listing of adjacent wireless base stations and their instantaneous transmission phase adjustments; scheduling unit 814 for generating a CPE phase management table (e.g., CPE phase management table 2200 in FIG. 22 for multiple base stations) for transmitting data to mobile stations associated with the server computer or base station; a beamforming unit 816 for generating the beamformed signals for transmission to a particular mobile device; and a priority fixing unit 818 for determining a priority level for interference associated with an adjacent interfering base station. The base station 700 may include the components in the software/database repository 810 for implementing the systems and methods in accordance with the present invention.

In addition, the server computer 800 may include a modem 808 for formatting data communications prior to transfer; a transceiver 806 for transmitting and receiving beamformed network communications amongst various network base stations, user equipment, and computing devices utilizing the data communication network 602 of the networked computing system 600; and a system bus 822 that facilitates data communications amongst all the hardware resources of the server computer 800.

Figure 9:
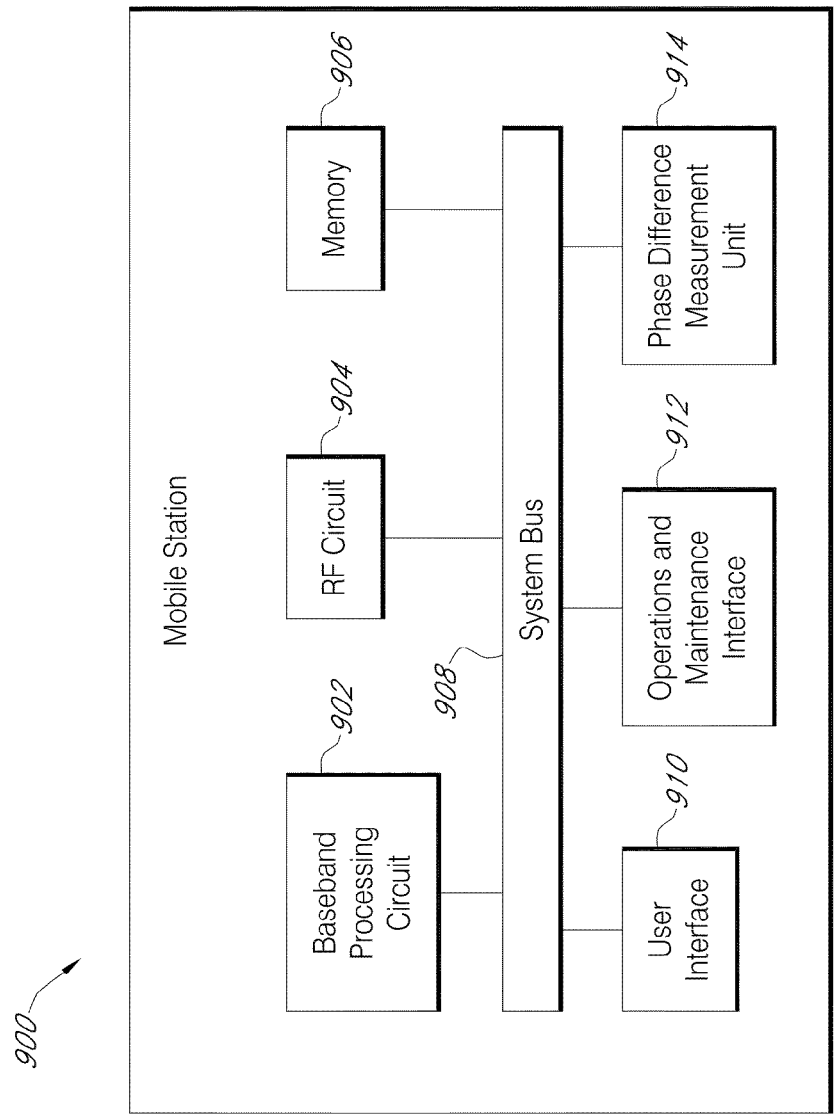
FIG. 9 illustrates a block diagram of a mobile station in accordance with an embodiment of the present invention.

FIG. 9 illustrates a block diagram of a mobile station 900 that may be representative of any of the subscriber devices (e.g., 608a-c, 622, 624, and 626) shown in FIG. 6. The mobile station 900 may include, but is not limited to, components similar to those described above in relation to the base station 700. Thus, mobile station 900 may include a baseband processing circuit 902 corresponding to the baseband processing circuit in FIG. 7, a RF Circuit 904 corresponding to the RF circuit in FIG. 7, a memory 906 corresponding to the memory 726, a system bus 908 corresponding to system bus 720, a user interface 910 corresponding to user interface 722, an operations and maintenance interface 912 corresponding to the operations and maintenance interface 724, and a phase difference measurement unit 914.

In an embodiment, the phase difference measurement unit 914 measures the phase difference between incoming signals from each base station. For example, the phase difference measurement unit 914 will determine a phase difference measurement for the signals from the intended base station, as well as determining a phase difference measurement for signals received from adjacent base station sectors received as interference. This measurement is needed at the mobile station 900 because the phase difference between the signals will vary as the signals may travel by different paths and arrive at the mobile station 900 with a shifted phase difference. In addition, the phase difference measurement unit may measure and record the signal characteristics of the intended signals and interfering signals, including power levels, interference levels (e.g., a signal-to-interference-plus-noise (SINR) level or a carrier-to-interference-plus-noise (CINR) level), or other characteristics.

FIGS. 10-34 illustrate systems and methods for coordinating the scheduling of beamformed data to reduce interference using two bits to quantize the phase angle reported by CPEs to their serving base stations according to an embodiment of the present invention. The serving base station selects one of four phase adjustment angles (in 90 degree steps) based on the bits received from the CPE in order to schedule the data transmission to the CPE. The two bit allows the phase zones to be quantized into four different levels. Each phase angle adjustment is mapped to a single phase angle difference in the present embodiment.

A quantized phase angle reporting and a quantized phase angle adjustment are performed to reduce interference and to increase desired signal strength at the CPE in accordance with an embodiment of the present invention. As described in more detail below, a mobile device/CPE (e.g., 108, 608a-c, 622, 624, 626, 900, MS1 and MS2) measures the phase difference (e.g., via phase difference measurement unit 914) between the two signals that it receives from each of the base station transmitters and transmits back the measurements to its serving base station. This measurement is quantized to one of four values by rounding the measured difference to the nearest 90 degrees. For example, if the measured difference is 244°, then the nearest 90° step is 270°.

Figure 10:
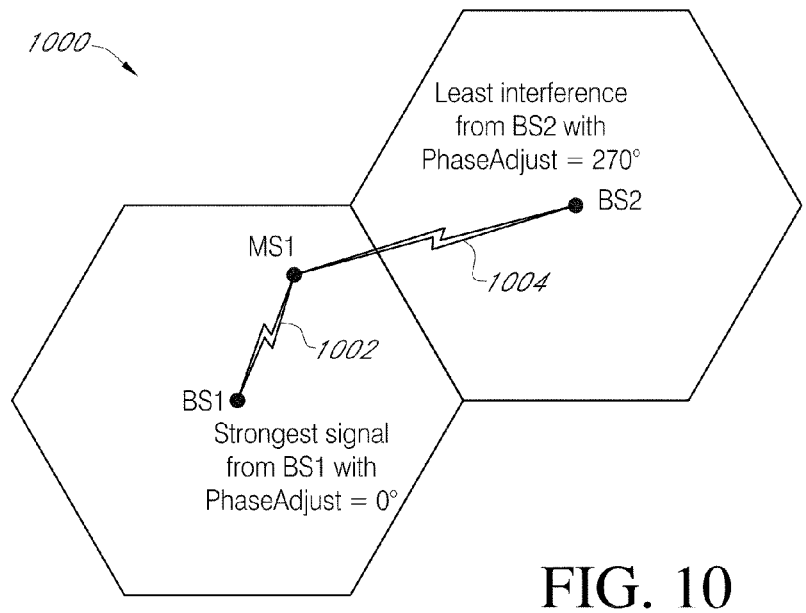
FIG. 10 illustrates a mobile station receiving interference from an adjacent sector in accordance with an embodiment of the present invention.

FIG. 10 illustrates a wireless system 1000 with a mobile station MS1 receiving interference 1004 from an adjacent sector in accordance with an embodiment of the present invention. In the wireless system 1000, the mobile station MS1 is in communication with base station BS1 via beamformed transmission 1002. In an embodiment, mobile station MS1 may be representative of mobile station 900, and base station BS1 and BS2 may be representative of base station 700. While the base station BS1 is in communication with the mobile station MS1, the best signal from BS1 is achieved when BS1 transmits to MS1 with a quantized phase adjustment of 0° (i.e., the signals arriving at MS1 from each of the BS1 transmits antennas combine to provide the strongest signal when no adjustment is made to the relative phases of the signals emitted from BS1). An example of the constructive interference at the receiving mobile station is seen as the combined signals in plots 202 and 302.

As the mobile station MS1 receives the intended signal from base station BS1, the mobile station MS1 also receives interference from the adjacent base station BS2. In this case, the signal that MS1 receives from BS2 can be attenuated the most when BS2 transmits with a quantized phase adjustment of 270°. In other words, the best CINR or SINR at MS1 is achieved when BS1 is transmitting to MS1 with a phase adjustment of 0° and BS2 is transmitting to a different mobile station in its coverage area with a phase adjustment of 270°.

Figure 11:
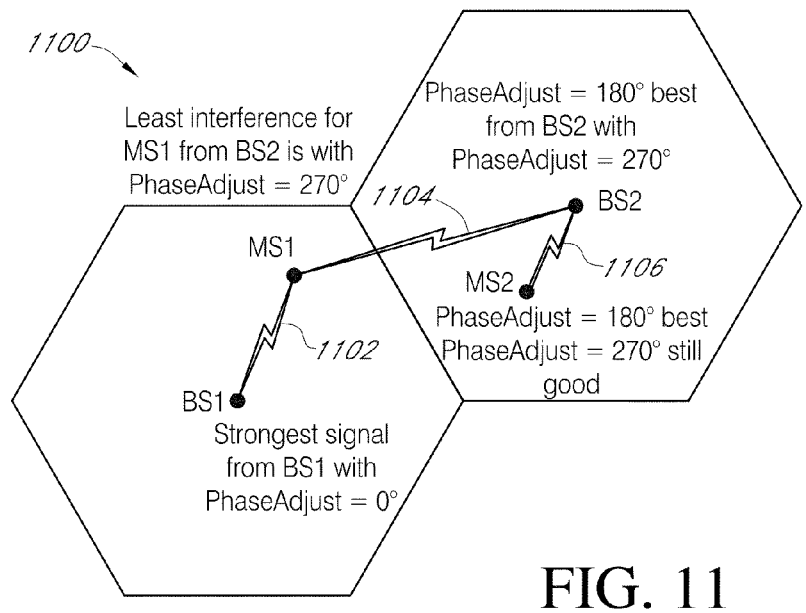
FIG. 11 illustrates coordinating scheduling of four-level quantized beams in accordance with an embodiment of the present invention.

FIG. 11 illustrates a wireless system 1100 similar to the wireless system 1000 in FIG. 10 with the addition of an additional mobile station MS2. In addition, FIG. 11 introduces the concept of coordinating scheduling of four-level quantized beams. In this case, the phase difference is quantized into four discrete regions, corresponding to a phase difference of 0°, 90°, 180°, and 270°. This quantization reduces the amount of feedback required from a mobile station to a base station when communicating phase difference information. The quantization also reduces computational overhead, while still providing exceptional control over the levels of constructive or deconstructive interference. This four-level quantization is explained further with reference to FIGS. 12-18.

Wireless system 1100 shows BS2 transmitting to a mobile station MS2 in its coverage area. The optimal combining of the signals arriving at MS2 from BS2 occurs when BS2 adjusts the relative phases of its transmissions by 180°. However, adequate performance at MS2 is still achieved if BS2 uses a phase adjustment of 90° or 270°. In this case, BS2 transmits to MS2 with a phase adjustment of 270°, while at the same time BS1 transmits to MS1 with a phase adjustment of 0°. The combined signal at MS2 is slightly degraded compared to the combining that could be achieved with a phase adjustment of 180°. However, the use of a phase adjustment of 270° instead of 180° improves the CINR at MS1 by a far greater amount than the loss in CINR at MS2. Thus, this optimization considers the efficiency gained at each mobile station MS1 and MS2 while considering the overall system efficiency for best efficiency gains.

Next, FIGS. 12-18 describe the four-level quantization of the phase difference and the effect on signal strength at a receiver. In an exemplary system implementing this coordination scheme (e.g., wireless beamforming system 100 and networked computing system 600), the relative phases of the signals (e.g., 104 and 106) transmitted by a base station (e.g., 102, 606a-c, 612, and 700) are adjusted in 90° steps. The mobile device/CPE (e.g., 108, 608a-c, 622, 624, 626, 900, MS1 and MS2) measures the phase difference (e.g., via phase difference measurement unit 914) between the two signals that it receives from each of the base station transmitters and transmits back the measurements to its serving base station. This measurement is quantized to one of four values by rounding the measured difference to the nearest 90 degrees. For example, if the measured difference is 244°, then the nearest 90° step is 270°.

The quantization to two bits may be performed at the mobile device and the quantized phase difference can be represented in a signaling message as two binary bits. For example, the mapping between the two-bit message and the phase difference can be applied as seen in FIG. 12.

Quantizing the phase difference to one of four values has the advantage of reducing the messaging overhead to a base station when compared to quantization to a larger number of values (e.g., it would require nine binary bits to signal a phase difference quantized to 1 degree steps). This aspect helps promote the goals of efficiency while not being computationally burdensome for scheduling.

Figure 13:
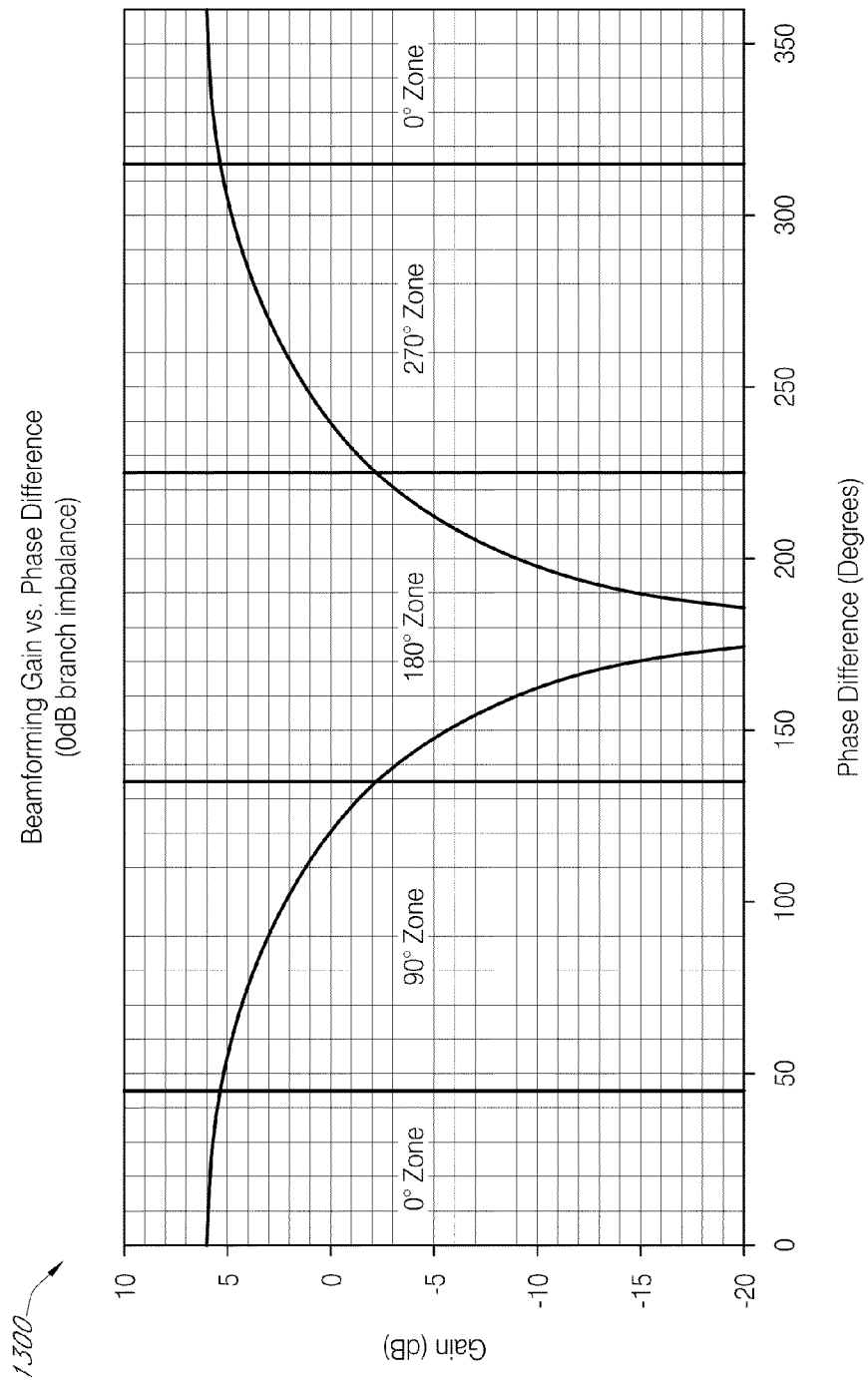
FIG. 13 illustrates a plot of the beamforming gain versus the phase difference of two signals with 0 dB branch imbalance at a receiver corresponding to quantized phase difference zones in accordance with an embodiment of the present invention.

When the base station (e.g., 102, 606a-c, 612, and 700) or server computer 800 receives the quantized phase difference, it can adjust the phase on one of the transmitters (e.g., in one of the transmitting antennas in a beamforming antenna array) so that the phase difference of the beamformed signals arriving at the mobile station fall into one of the zones shown in FIG. 13.

FIG. 13 illustrates a plot 1300 of the beamforming gain versus the phase difference of two signals with 0 dB branch imbalance at a receiver corresponding to quantized phase difference zones in accordance with an embodiment of the present invention. If the base station adjusts the phases so that the phase difference of the signals arriving at the user equipment falls into the 0° zone then the signals combine to provide the largest increase in signal strength at the receiver. If the base station adjusts the phases so that the phase difference of the signals arriving at the user equipment falls into the 180° zone then the signals combine to provide the most reduction in signal strength at the receiver. If the signals are aligned so that the phase difference falls into the 90° or 270° zones then the combined signal may either have a gain or slight reduction in gain when compared to one of the originally transmitted signals.

FIG. 14 illustrates a table 1400 showing the average gain of the combined signals in FIG. 13 relative to the signal transmitted from one of the antennas for each of the quantized phase zones in accordance with an embodiment of the present invention. On average, the strongest signal strength is achieved if the phases are adjusted so that the phase difference at the receiver falls into the 0° zone. If the phase difference is adjusted so that it falls in either the 90° or 270° zones then on average the combined signal strength is 3 dB lower than the average signal strength achieved in the 0° zone. If the phase difference is adjusted such that it falls in the 180° zone then on average the combined signal is attenuated by 14 dB relative to the signal in the 0° zone.

Figure 15:
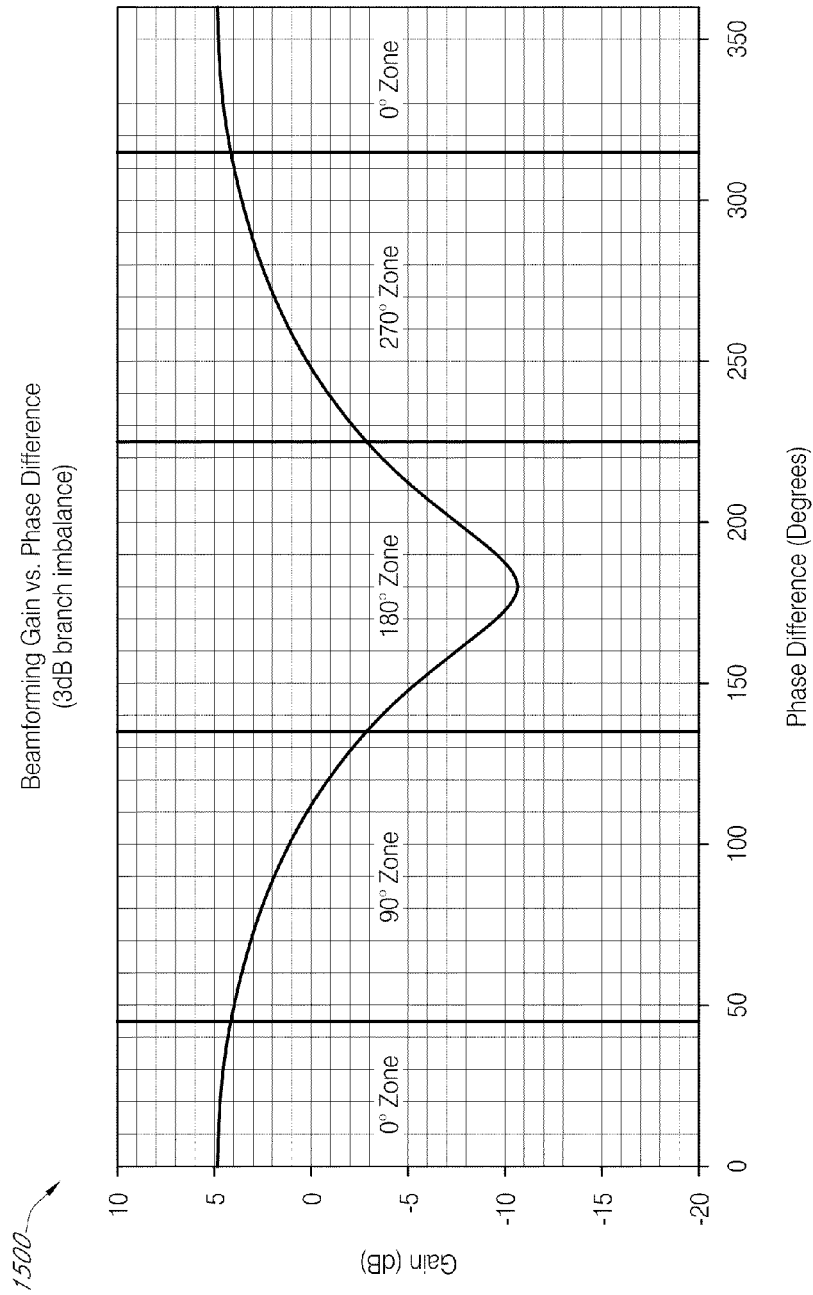
FIG. 15 illustrates a plot of the beamforming gain versus the phase difference of two signals with 3 dB branch imbalance at a receiver corresponding to quantized phase difference zones in accordance with an embodiment of the present invention.

FIG. 15 illustrates a plot 1500 of the beamforming gain versus the phase difference of two signals with 3 dB branch imbalance at a receiver corresponding to quantized phase difference zones in accordance with an embodiment of the present invention. In this plot 1500, the beamforming gain is relative to the stronger of the two received signals.

FIG. 16 illustrates a table 1600 showing the average gain of the combined signals in FIG. 15, relative to the stronger of the two received signals, for each of the quantized phase zones in accordance with an embodiment of the present invention. Phase differences in the 0°, 90° and 270° zones show the best average signals strengths, while phase differences falling in the 180° zone shows the best average combined signal attenuation.

Figure 17:
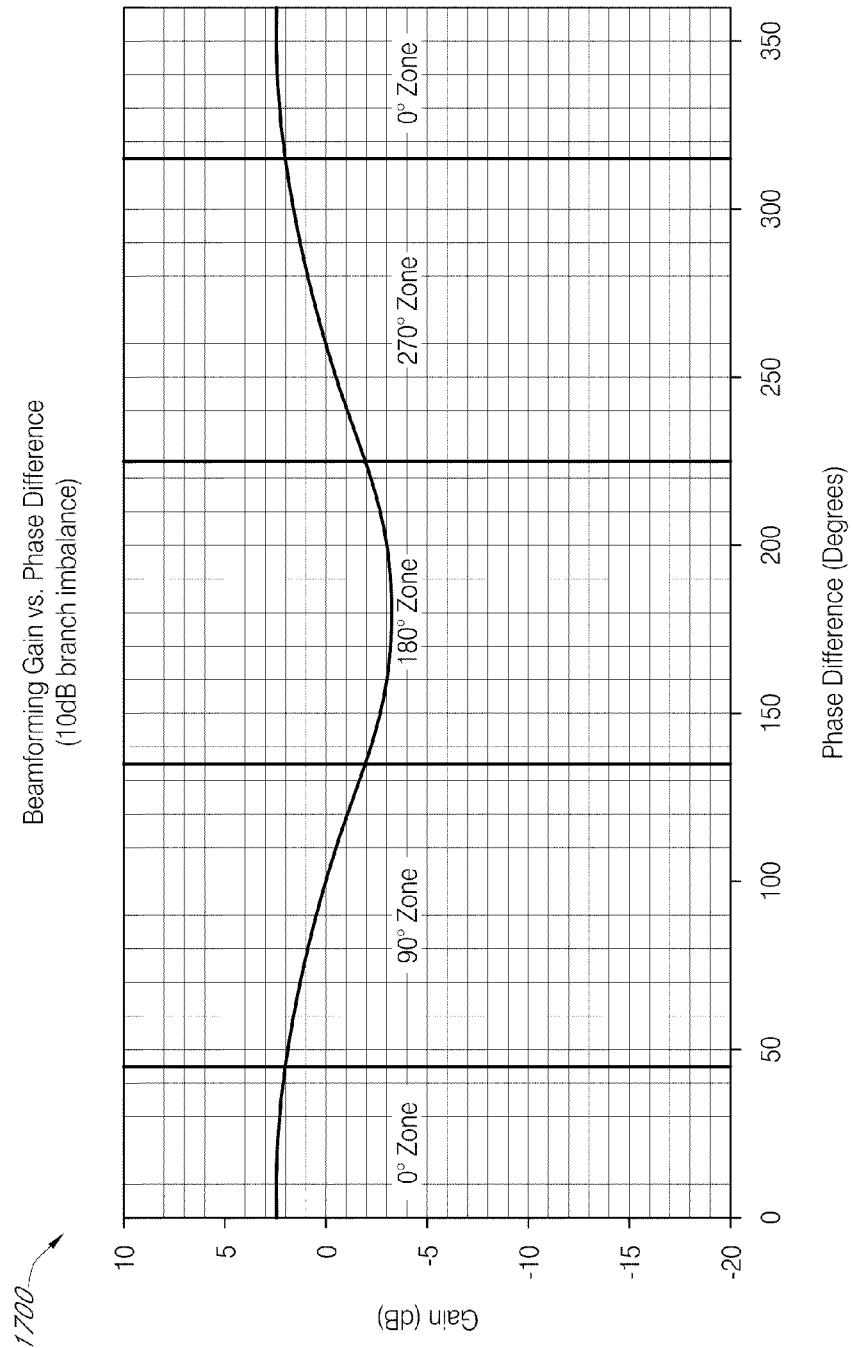
FIG. 17 illustrates a plot of the beamforming gain versus the phase difference of two signals with 10 dB branch imbalance at a receiver corresponding to quantized phase difference zones in accordance with an embodiment of the present invention.

FIG. 17 illustrates a plot 1700 of the beamforming gain versus the phase difference of two signals with 10 dB branch imbalance at a receiver corresponding to quantized phase difference zones in accordance with an embodiment of the present invention. As in the case of FIG. 15, the beamforming gain is relative to the stronger of the two received signals. Note that in this case the gain in the 0° zone is less than that shown in FIG. 13 and FIG. 15. Additionally, the attenuation in the 180° zone is less than that achieved when the relative signal strengths is the signals from both of the transmit antennas are close together at the receiver.

FIG. 18 illustrates a table 1800 showing the average gain of the combined signals in FIG. 17, relative to the stronger of the two received signals, for each of the quantized phase zones in accordance with an embodiment of the present invention. As before, phase differences in the 0°, 90° and 270° zones show the best average signals strengths, while phase differences falling in the 180° zone shows the best average attenuation for the combined signal.

Figure 19:
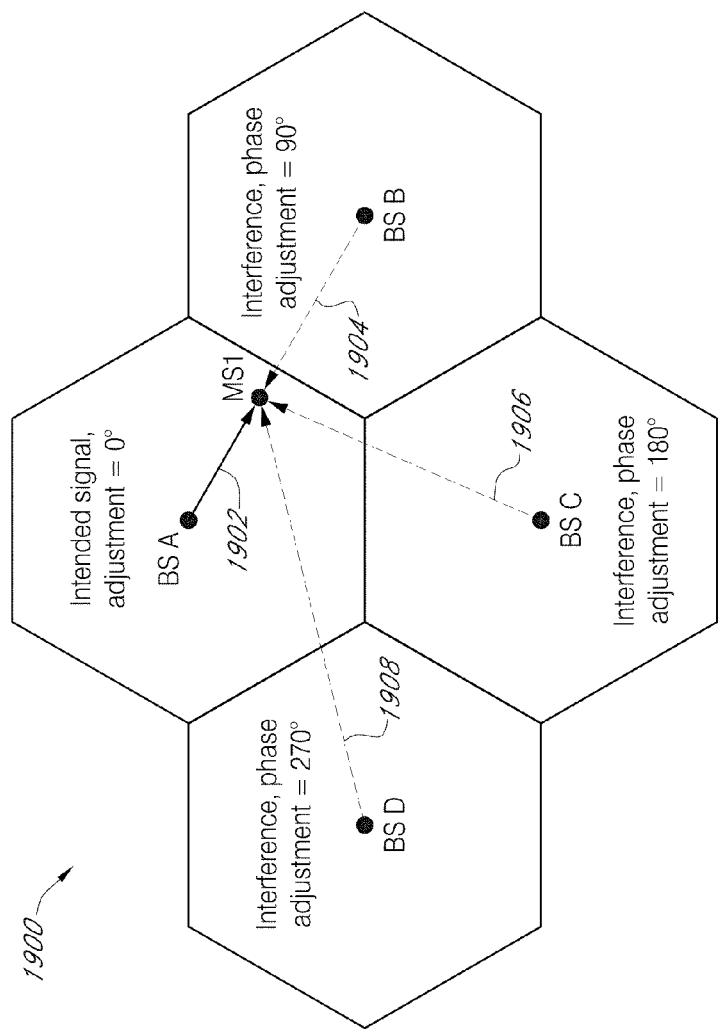
FIG. 19 illustrates a mobile station receiving an intended signal from a first base station and receiving interference from adjacent sectors with varying phase adjustments in accordance with an embodiment of the present invention.

Next, FIG. 19 illustrates a mobile station receiving an intended signal from a first base station and receiving interference from adjacent sectors with varying phase adjustments in accordance with an embodiment of the present invention. As will become apparent when viewing FIG. 19 in conjunction with the phase adjustment map of FIG. 20, the base station BS A in communication with the mobile station MS1 is transmitting a beamformed transmission signal 1902 with a phase adjustment of 0 degree. At the same time and utilizing the same wireless resources (e.g., frequency, channels, timeslots, etc.) adjacent base station BS B is transmitting a beamformed signal 1904 with a phase adjustment of 90 degrees. The beamformed transmission signal 1904 is received at MS 1 as interference rather than as a communication. In addition, base station BS C is transmitting a beamformed signal 1906 with a phase adjustment of 180 degrees, and base station BS D is transmitting a beamformed signal 1908 with a phase adjustment of 270 degrees. Signals 1906 and 1908 are also received as interference at MS 1. Referring to FIGS. 19, 20, and 21, the transmission snapshot in FIG. 19 corresponds to the phase adjustments used by base stations A, B, C, and D as scheduled in column 1, timeslot 1 of tables 2002, 2004, 2006, and 2008 in FIG. 20.

FIGS. 20-34 illustrate an example of how data transmissions among multiple base stations (e.g., base stations BS A, BS B, BS C, and BS D in FIG. 19) can be scheduled such that the interference to adjacent base station sectors is reduced, by coordinating the adjustment of relative phases of the transmitted signals at each base station. The below example assumes two transmitters at each base station site (e.g., similar to the two-transmitter beamforming antenna array 102 in FIG. 1) and assumes that the relative phases of the transmitted signals are adjusted in 90° steps (i.e., the phase differences are quantized in the four-level quantization scheme shown in FIG. 12).

FIG. 20 illustrates a phase adjustment map in accordance with an embodiment of the present invention. In this example, there are four base stations in a cluster: base stations A, B, C, and D, similar to the topology shown in FIG. 19, although it is apparent that the systems and methods described herein may be applicable to any number of base station, servers, or mobile devices.

In addition, in this example there are ten mobile stations in communication with base station A, with CPE IDS 1-10 (e.g., see CPE IDS 1-10 in FIG. 22). This example also assumes that each CPE/mobile station can measure the phase difference between the signals arriving from its serving base station and the phase differences of the phases of signals arriving from interfering base stations. The phase difference can be measured via pilot reference signals or other methods known in the art, or via a phase difference measurement unit similar to the phase difference measurement unit 914 in FIG. 9. This example also assumes that the mobile station/CPE reports this information back to the serving base station and/or to a server computer for centralized scheduling. Note that in Time Division Duplexing (TDD) systems, it may possible for the base station to exploit the reciprocity of the channel to determine the phase difference between the signals arriving at a CPE being served by the base station without explicit feedback from the CPE. However, the CPE will still need to measure the phase differences between the signals arriving from the interfering base stations and their levels and report those phase differences and levels back to the serving base station and/or server computer.

In regards to FIGS. 20 and 21, this example assumes further that an airlink framing structure has been defined, consisting of multiple timeslots, with each timeslot containing multiple frequency slots. Many OFDM airlink structure are like this (e.g., LTE or AMC permutation mode in WiMAX). In an embodiment, these systems and methods for coordinating scheduling of beamformed data may be applied to any wireless technology, including, but not limited to: GSM™, UMTS™, LTE™, LTE Advanced™, Wi-Max™, Wi-Fi™, etc.

Consistent with an OFDM structure, in the present embodiment the wireless resources are structured such that there are thirty-two frequency slots in a timeslot and that a data burst can be sent in each time/frequency slot (e.g., 32 data bursts can be sent in a single timeslot—potentially one to each of up to 32 mobile stations/CPE). A framing structure is also applied, where a frame consists of eight timeslots.

Returning to FIG. 20, these tables illustrate a phase adjustment map 2000 in accordance with an embodiment of the present invention. In this example, the four base stations A, B, C, and D are assigned a fixed phase transmission pattern in timeslots 0-3. The 32 frequency slots in a time slot are divided into eight groups of four each (i.e., there are 8 frequency slots per group). Each group of frequency slots is allocated a fixed phase adjustment value. This frequency structure is shown in FIG. 21 as table 2100, illustrating the frequency resources used for a base station. FIG. 21 shows the eight timeslots used to allocate resources for the beamformed scheduling. In addition, the 32 frequency resources are divided equally into four groups, shown as columns 2102, 2104, 2106, and 2108. Thus, in FIG. 21 it is clear that Timeslot #1 corresponding to the Phase Adjustment #2 refers to the group of frequencies (i.e., channels) numbered 8-15. Applying this frequency table to the phase adjustment map in FIG. 20, it can be seen that, for example, base station B is transmitting at a phase adjustment of 180 degrees in Timeslot #1 for channels 8-15. At the same time, base station A is transmitting at a phase adjustment of 90 degrees for the identical timeslot/channel combination.

In FIG. 20, for timeslots 4-7, any phase may be transmitted in any frequency slot. These slots are used when the coordinating scheduling cannot be completed in the first four timeslots and for transmissions which are not interference limited. Thus, timeslots 4-7 may be considered to be "all purpose" timeslots for transmissions where interference is not an issue and for when guaranteed phase differences are not required.

The assignment of phase adjustments to frequency and time slots in a phase adjustment map 2000 can be done in a variety of ways. For ease of explanation, the phase adjustment map is shown using a fixed assignment in FIG. 20. In a fixed assignment, phase differences are allocated beforehand, using a reuse pattern, similar to the frequency reuse patterns commonly employed in cellular wireless systems. In a separate embodiment, the phase adjustment map may be dynamically determined based on the phase difference measurements made by the mobile station. These measurements can be shared among the base stations, which can then agree upon an appropriate phase adjustment map, or can be sent to a central processing server that then determines an appropriate phase adjustment map for each base station and sends the maps to the base stations. In a dynamic determination of the phase adjustment maps, the update rate of the phase adjustment maps may be as quick as every one to five airlink frames, or may be relatively slow, on the order of one update every several seconds. In another embodiment, the phase adjustment may be determined based on historical data or instantaneous factors such as demand or interference levels.

Again note that it may not be necessary to attempt to reduce interference at all mobile stations/CPE in the coverage area of a base station. Many mobile stations/CPE will have good CINR to begin with, so they will not need special handling. In this example, data to such mobile stations/CPE can be transmitted in the "all purpose" timeslots 4-7, or in timeslots 0-3 if the schedule can accommodate the additional mobile stations.

FIG. 22 illustrates a CPE phase management table 2200 at base station A with various mobile station transmission and interference data in accordance with an embodiment of the present invention. For this example, Base Station A (BTS A) has 10 mobile stations/CPE to which it will transmit data. The number of blocks of data and the optimal phase adjustment angle to be used by BTS A to transmit to the CPEs is shown in table 2200. Additionally, the best phase adjustment angles that the base stations causing interference with each of the CPEs should use to minimize the interference levels is also shown in the table. Looking at the data related to CPE #1 in table 2200, the CPE #1 receives the strongest signal from base station A when base station A is transmitting at a 0 degree phase difference. In addition, CPE #1 receives the least interference from base station B when base station B is transmitting to its associated CPE on the same wireless resources at a phase adjustment of 180 degrees.

The entries in the CPE phase management table 2200 in the interfering BTS phase adjustment cells have two numbers. The top number is the phase adjustment in degrees from that base station that results in the lowest levels of interference at the mobile station served by BTS A. The bottom number is a priority that is assigned to each of the interferers, indicating the relative priority of reducing the interference levels. Continuing with the reference to CPE #1, the phase adjustment that results in the lowest level of interference at the mobile station CPE #1 from each of BTS B is 180 degrees, as mentioned above. In addition, for CPE #1 it is the priority 1 to reduce the interference from base station B. In this scheduling algorithm, the priority ranking is 1 to 4, with 1 being the highest priority. Note that as would be apparent to a person of ordinary skill in the art, the number of priority levels could be greater than or less than four. The priority can be assigned in a variety of ways, such as placing the highest priority on reducing interference from the strongest interferers seen by CPEs with the lowest CINR, or on base stations causing the greatest levels of interference to a CPE, or using some other prioritization scheme. By way of example, in FIG. 19, reducing the interference from base station B may have been the highest priority because the signal strength from base station B would be the highest relative to the other adjacent interfering base stations (e.g., because of the relative distances from the base stations to the mobile station MS 1).

Next, the coordinated scheduling algorithm will be described generally by way of example in relation to flow diagrams in FIGS. 23 and 24, followed by a specific scheduling example in FIGS. 25-32.

Figure 23:
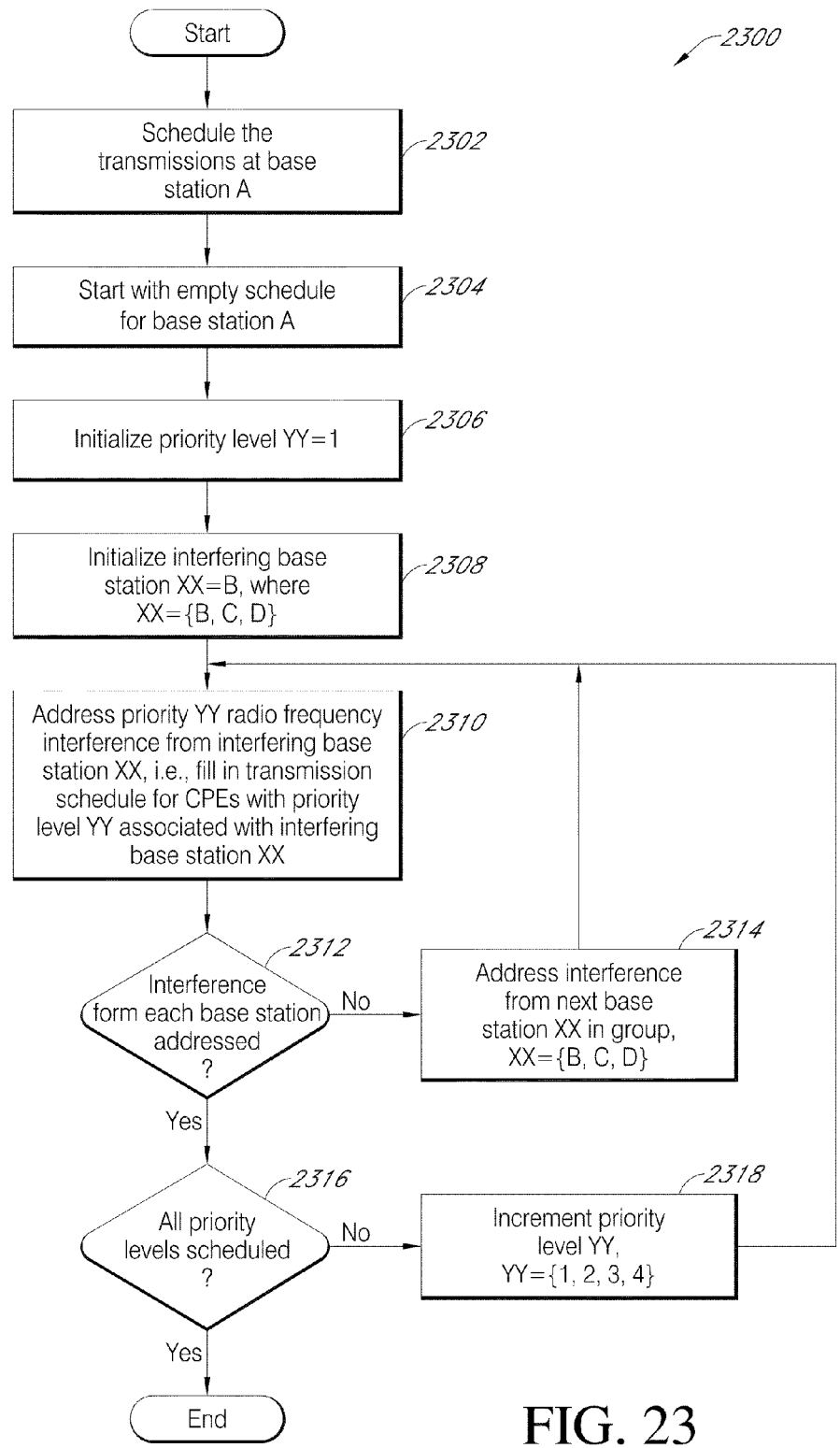
FIG. 23 illustrates a flow diagram depicting processes for scheduling transmissions at a base station in accordance with an embodiment of the present invention.

FIG. 23 illustrates a flow diagram 2300 depicting processes for scheduling transmissions at a base station in accordance with an embodiment of the present invention. It should be understood that this process could be executed using one or more computer-executable programs stored on one or more computer-readable media located on any one of the base station devices (e.g., 606a-c, 612, 700, and BS 1 and BS 2 of FIGS. 10 and 11) or in the server computer 800 in FIG. 8. In blocks 2302 and 2304, the process begins with scheduling the transmissions at base station A in an empty schedule. Next, in block 2306, the process initializes the priority level YY=1. Starting at the priority 1 level may reduce the worst interference before scheduling around less important (i.e., lower priority) interfering transmissions. Next, at block 2308, the process initializes the interfering bases station XX=B, where the interfering base station is selected from the group consisting of base stations B, C, and D. Again, note that process 2300 may be adaptable to any number of base stations, mobile devices, and priority levels. Next, at block 2310, the process addresses priority YY radio frequency interference from interfering base station XX. In accordance with the initialized values, the algorithm addresses the priority 1 interference from base station B.

At block 2312, the process checks to see whether interference from each base station at that particular priority level has been addressed. If not, the process moves to step 2314, where the algorithm addresses interference from the next base station in the group (e.g., moves to addressing interference for base station C after addressing interference from base station B in step 2310, thereby updating the XX variable). When the interference from each base station has been addressed at the particular priority level (e.g., YES in step 2312), the process moves to step 2316 to check whether all priority levels have been addressed. If NO, the process moves to step 2318 where the priority level is incremented (i.e., YY is incremented), and the process returns to block 2310 to address interference for the adjacent base stations. Thus, the process 2300 cycles through the outer loop (addressing interference for each priority level) and the inner loop at each priority level (addressing interference for each base station at a particular priority level).

Figure 24:
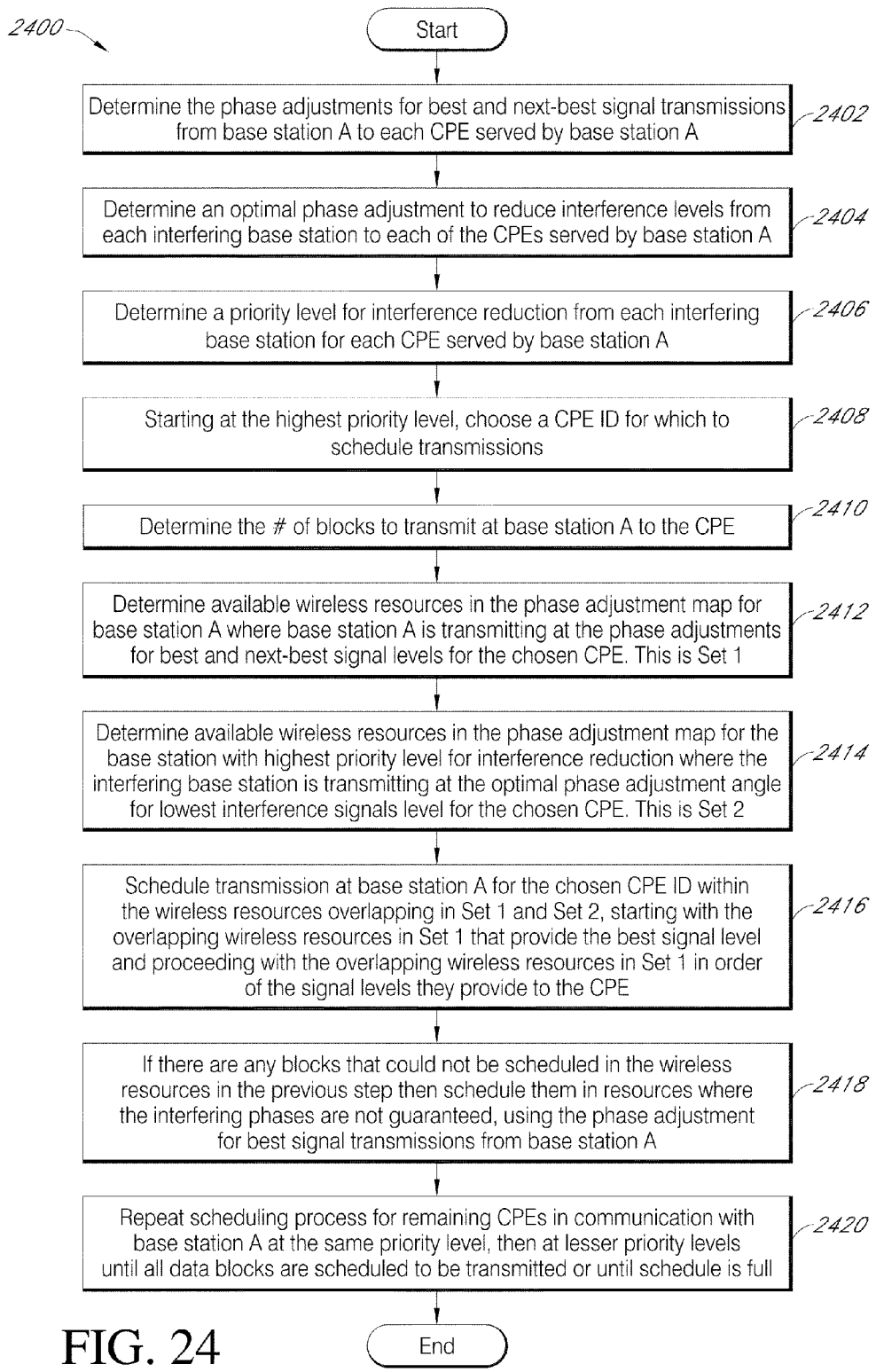
FIG. 24 illustrates a flow diagram depicting processes for scheduling transmissions at a base station in accordance with an embodiment of the present invention.

FIG. 24 illustrates a flow diagram 2400 depicting processes for scheduling transmissions at a base station in accordance with an embodiment of the present invention. This flow diagram may be used alone or in conjunction with FIG. 23 to illustrate the scheduling process. Again, it should be understood that this process could be executed using one or more computer-executable programs stored on one or more computer-readable media located on any one of the base station devices (e.g., 606a-c, 612, 700, and BS 1 and BS 2 of FIGS. 10 and 11) or in the server computer 800 in FIG. 8. The scheduling process 2400 begins at block 2402 by determining the phase adjustments for best and next-best signal transmissions from base station A to each CPE served by base station A. This information is portrayed as the column entitled "Phase Adjustment for best signal level" in FIG. 22. Next, at block 2404, the process determines an optimal phase adjustment to reduce interference levels from each interfering base station to each of the CPEs served by base station A. Next, at block 2406, the process determines a priority level for interference reduction from each interfering base station for each CPE served by base station A. This information determined in blocks 2404 and 2406 is portrayed as the column entitled "Optimal Phase Adjustment (in degrees) to reduce interference level and priority for interference reduction" in FIG. 22.

In block 2408 the process starts at the highest priority level and chooses a CPE ID for which to schedule transmissions. For the CPE chosen in block 2408, the process determines the number of blocks to transmit at base station A to the CPE in block 2410. This information is portrayed as the column entitled "# Blocks to transmit" in FIG. 22.

Next, in block 2412, the process determines available wireless resources in the phase adjustment map for base station A, where base station A is transmitting at the phase adjustments for best and next-best signal levels for the chosen CPE. The available wireless resources meeting this requirement may be denoted as "Set 1." By way of example, if the process was performing the actions in step 2412 for CPE #1 in FIG. 22, the process would look for the timeslots in table 2002 that correspond to the phase adjustment of 0 degree (for best signal levels) and for the timeslots in table 2002 that correspond to the phase adjustments of 90 degrees and 270 degrees (next-best signal levels). This Set 1 consists of the first, second, and fourth columns in table 2002.

Next, at block 2414, the process determines a second set of wireless resources corresponding to wireless resources in the phase adjustment map for the base station with highest priority level for interference reduction where the interfering base station is transmitting at the optimal phase adjustment angle for lowest interference signals level for the chosen CPE. By way of example, the base station with the highest priority level for interference reduction for CPE #1 is base station B, as seen in FIG. 22. FIG. 22 also states that the optimal phase adjustment for the transmissions for base station B is 180 degrees. Looking at the phase adjustment map for base station B, i.e., table 2004, the wireless resources that satisfy these requirements can be found: column 1, timeslot 2; column 2, timeslot 1; column 3, timeslot 0; and column 4, timeslot 3. As mentioned above, this is Set 2.

In block 2416, the process schedules transmissions at base station A for the chosen CPE ID within the wireless resources overlapping in Set 1 and Set 2, starting with the overlapping wireless resources in Set 1 that provide the best signal level and proceeding with the overlapping wireless resources in Set 1 in order of the signal levels they provide to the CPE. In regards to Set 1 and Set 2 in the example above, the best wireless resource for base station A would be column 1, timeslot 2, when base station A is transmitting with a phase adjustment of 0 degree. The corresponding wireless resource in base station B is column 1, timeslot 2, when base station B is transmitting at a phase adjustment of 180 degrees. Thus, by choosing this resource, the transmissions for CPE #1 are scheduled to be transmitted at the most advantageous conditions for maximum signal reception from base station A, while being transmitted in the same wireless resources where the interference from the base station causing the most interference is minimized. If there is not enough room in column 1, timeslot 2, to contain all the transmissions to the chosen CPE ID then additional data to the CPE is scheduled in the wireless resources with the next-best signal levels for the chosen CPE (e.g., the resources in column 2, timeslot 1, or column 4, timeslot 3 of phase adjustment maps 2002 and 2004).

Next, at block 2418, the process continues to schedule the remaining data blocks for transmission. If there are any blocks that could not be scheduled in the wireless resources in the previous step, block 2418 either schedules the blocks in resources where the interfering phases are not guaranteed, using the phase adjustment for best signal transmissions from base station A, or block 2418 places those blocks into a queue where they are retained for transmission in a future airlink frame. By way of example, if there were remaining data to be scheduled for CPE #1 in the example above, the remaining blocks could be scheduled for transmission in timeslots 4-7 of base station A, or buffered for transmission in a subsequent airlink frame. If transmitting in the resources where the interfering phases are not guaranteed, base station A would transmit to CPE #1 with a phase shift of 0 degree, which corresponds to the "Phase Adjustment for Best Signal Level" of FIG. 22.

Finally, at block 2420 the scheduling process is repeated for remaining CPEs in communication with base station A at the same priority level, then at lesser priority levels until all data blocks are scheduled to be transmitted or until the schedule is full. Thus, the scheduling process schedules all priority-one interference for CPEs #2-10, and then repeats the process again at lesser priority levels until all the transmissions are scheduled. Once a CPE has been scheduled at a particular priority level, there is no need to schedule it again at lesser priority levels. Additionally, this process is scheduled at each base station (e.g., base stations B, C, and D) until all transmissions are scheduled.

By way of example, FIGS. 25-32 collectively schedule CPEs in the CPE phase management table shown in FIG. 22 for scheduling data for transmission from base station A. Variants in the scheduling process can easily be derived that are considered to be within the scope of this invention.

Thus, FIG. 25 illustrates an empty transmission schedule at a base station A in accordance with an embodiment of the present invention. This is the start of the exemplary scheduling process, and may be referred to as step one.

Next, FIG. 26 illustrates a transmission schedule after addressing first-priority interference from base station B in accordance with an embodiment of the present invention, and may be referred to as step two. In FIGS. 26-32, the CPE and number of blocks to be transmitted are shown in the time slot and frequency map. The number of blocks to be transmitted to a CPE is shown in brackets next to the CPE ID. The CPEs that are scheduled in each step are shown in a bold font.

In the second step of addressing first-priority interference from base station B, the optimal scheduling location for CPE #1 is timeslot #2 on the frequency resources that have a phase adjustment of zero degree from base station A. This optimal phase adjustment can be seen in FIG. 22, and the phase adjustment map for base station A is seen as table 2002. In timeslot #2, on those same frequency resources (i.e., resources where base station A is transmitting at a phase adjustment of zero degree), base station B is guaranteed to transmit to CPEs in its coverage area with a phase adjustment of 180 degrees.

Note that only eight blocks of data can be transmitted in that timeslot with that phase adjustment because there are only 8 channels transmitting in this example at that phase adjustment during the particular timeslot, as seen in FIG. 21. However, there are 14 blocks to be transmitted to CPE #1. As a result, it is necessary to schedule the remaining six blocks of data to CPE #1 onto a different set of time/frequency resources. Since the best gains are achieved by making sure that the transmissions to CPE #1 are scheduled for when base station B uses a phase adjustment of 180 degrees, the scheduling algorithm should choose time/frequency resources where base station B transmits with a 180 degree phase adjustment. The algorithm should also choose a phase adjustment from base station A that is within +/−90 degrees of the optimal phase adjustment from base station A. This second-best phase adjustment may correspond to the phase adjustment for next-best signal levels as mentioned in block 2412 of FIG. 24. In this case, that means a phase adjustment of 90 degrees or 270 degrees (i.e., a +270 degree phase adjustment is equivalent to a −90 degree phase adjustment). In this case, the remaining six blocks are scheduled for timeslot 1, on the frequency resources where base station A has a phase adjustment of 90 degrees and base station B has a phase adjustment of 180 degrees. The result of this scheduling can be seen in FIG. 26, where eight blocks of data to be transmitted to CPE #1 are scheduled in the first column in timeslot 2, and the remaining six blocks of data are scheduled in the second column, timeslot 1.

Similarly, the optimal scheduling location for CPE #5 is in timeslot #1 on the frequency resources with a phase adjustment of 180 degrees from base station A (e.g., see FIG. 21, column entitled "Phase Adjustment for best signal level"). Cross-referencing the phase adjustment maps in FIG. 20, it is determined that base station B transmits with a phase adjustment of 270 degrees on this set of time/frequency resources. Since there are only 6 blocks to be transmitted to CPE #5, all of the blocks can be scheduled on these time/frequency resources. Again, the result of scheduling CPE #5 is seen in FIG. 26, where six blocks of data to be transmitted to CPE #1 are scheduled in the third column in timeslot 1.

Next, the remaining CPE with first-priority interference from base station B, i.e., CPE #10, is scheduled by the scheduling algorithm. CPE #10 transmissions are scheduled for timeslot 0 in the frequency resources with a phase adjustment of 270 degrees from base station A. Base station B will transmit with a phase adjustment of 270 degrees on these resources, minimizing the level of interference seen at this CPE. Since CPE #10 has ten blocks to transmit, eight of the blocks are scheduled for these time/frequency resources, and in this example the remaining blocks are scheduled for timeslot 3 on the frequency resources with a phase adjustment of 0 degree from base station A and 270 degrees from base station B. The updated schedule is shown in FIG. 26.

Next, the scheduling algorithm addresses priority 1 interference from base station C. The results of this scheduling step are seen in FIG. 27, and may be referred to as step three. In addressing the priority 1 interference from base station C, the transmissions for CPE #3 and CPE #8 are scheduled in a similar manner to the transmissions in step two. Eight of the twelve data blocks to be transmitted to CPE #3 are scheduled for timeslot 2, phase adjustment of 90 degrees, which corresponds to a phase adjustment of 0 degree at base station C (e.g., see phase adjustment maps 2002 and 2006). The remaining four data blocks for CPE #3 are scheduled on timeslot 0, again with a phase adjustment of 0 degree at base station C, but a next-best phase adjustment of 0 degree at base station A.

The two blocks of data for CPE #8 are scheduled for their optimal time/frequency resources on timeslot 3, with a phase adjustment of 270 degrees from base station A and zero degree from base station C. The updated schedule is shown in FIG. 27.

Next, the scheduling algorithm addresses priority 1 interference from base station D. FIG. 28 illustrates a transmission schedule after addressing priority 1 interference from base station D in accordance with an embodiment of the present invention, and this step may be referred to as step four. Looking at the table 2200 in FIG. 22, it can be seen that only CPE #2 is receiving priority 1 interference from base station D. All eight blocks for CPE #2 are scheduled for timeslot 1 with a phase adjustment of 0 degree from base station A and 270 degrees for base station D.

After having addressed the priority 1 interference for base station B, C, and D, the scheduling algorithm next schedules the priority 2 CPEs on base station B. This scheduling is seen in FIG. 29, which illustrates a transmission schedule after addressing second-priority interference from base station B in accordance with an embodiment of the present invention. This step may be referred to as the fifth step. Eight blocks for CPE #7 are scheduled in the optimal position in timeslot #1 while the remaining two blocks are scheduled for timeslot 2 where the phase adjustment for base station B is still the optimal 0 degree and the phase adjustment from base station A is suboptimal, but still within +/−90 degrees of optimum, representing the next-best phase adjustment from the serving base station. The updated schedule is shown in FIG. 29.

In the sixth step, the scheduling algorithm would schedule the priority 2 CPEs on base station C. However, there are no CPEs to be scheduled, so the algorithm moves to the next step (e.g., see FIG. 22).

In the seventh step, the algorithm addresses the priority 2 CPEs in relation to base station D. FIG. 30 illustrates the transmission schedule after addressing priority 2 interference from base station D in accordance with an embodiment of the present invention. The optimal scheduling location for CPE #4 is on timeslot 1 on the frequency resources with a phase adjustment of 90 degrees from base station A and a phase adjustment of 0 degree from base station D. Since there are already six blocks of data scheduled on those resources and there are only eight such resources available, only two of the blocks of data for CPE #4 can be sent on those resources. The remaining four blocks are sent on timeslot 3 with a phase adjustment from base station A of 180 degrees (i.e. using the next-best phase adjustment) and a phase adjustment of 0 degree from base station D.

For step eight, there is only one priority 3 CPE to schedule. FIG. 31 illustrates the transmission schedule after addressing priority 3 interference in accordance with an embodiment of the present invention. In this example, the optimal location for transmissions to CPE #6 has a phase adjustment of 180 degrees from base station A, which corresponds to wireless resources in the third column of phase adjustment map 2002. In regards to the interference received by CPE #6, there are two priority 3 interference sources, the first being from base station B, while the second is from base station D (e.g., see FIG. 22). Looking at FIG. 22 it can be seen that the optimal phase adjustment to reduce interference from base station B and D is 0 degree. Cross-referencing the phase adjustment map 2002 with the phase adjustment maps 2004 and 2008 (corresponding to base stations B and D), it can be determined there are two optimum slots in the transmission schedule. In this case, the algorithm can schedule the blocks for CPE #6 in timeslot 2, column 3, where the interference from base station B will be reduced, or on timeslot 3, column 3, where the interference from base station D will be reduced. In this case, it is assumed that the algorithm selects to schedule four resource blocks to be sent on timeslot 3 and two resource blocks sent on timeslot 2. The updated schedule after the eighth step is shown in FIG. 31.

In the ninth step, there is one priority 4 CPE to schedule, i.e., CPE #9 (e.g., see FIG. 22). This CPE has the lowest priority level for scheduling. Since the best signal for this CPE is with a phase adjustment of 270 degrees from base station A, the algorithm schedules transmissions to this CPE in the available time/frequency resources with this phase adjustment. Thus, FIG. 32 illustrates a transmission schedule after addressing priority 4 interference in accordance with an embodiment of the present invention.

In the scheduling example above, the example shows how all the CPEs are scheduled. In some cases it may not be possible to match up all CPE transmissions with either a fully optimal set of phase adjustment from the serving and interfering base stations, or a next-best, sub-optimal set of phase adjustments (i.e., optimal for the interfering base station and +/−90 degrees from optimal for the serving base station). In those cases the CPE transmissions can be scheduled on timeslots 4-7, where no guarantees are made on the phase adjustments from any base stations. However, the serving base station may still use beamforming transmission to optimize the downlink to the mobile devices while transmitting in timeslots 4-7. Alternatively, the blocks to be transmitted to a CPE may be buffered for scheduling in a subsequent airlink frame.

Although in the above example the scheduling of transmissions to mobile devices/CPE served by base stations B, C, and D is not shown, these transmissions are scheduled in a similar manner to those at base station A. As long as base stations B, C, and D adjust their phases according to the phase adjustment maps previously agreed to, the scheduling of particular CPEs in certain time/frequency slots can be performed independently at each of these base stations.

Figure 33:
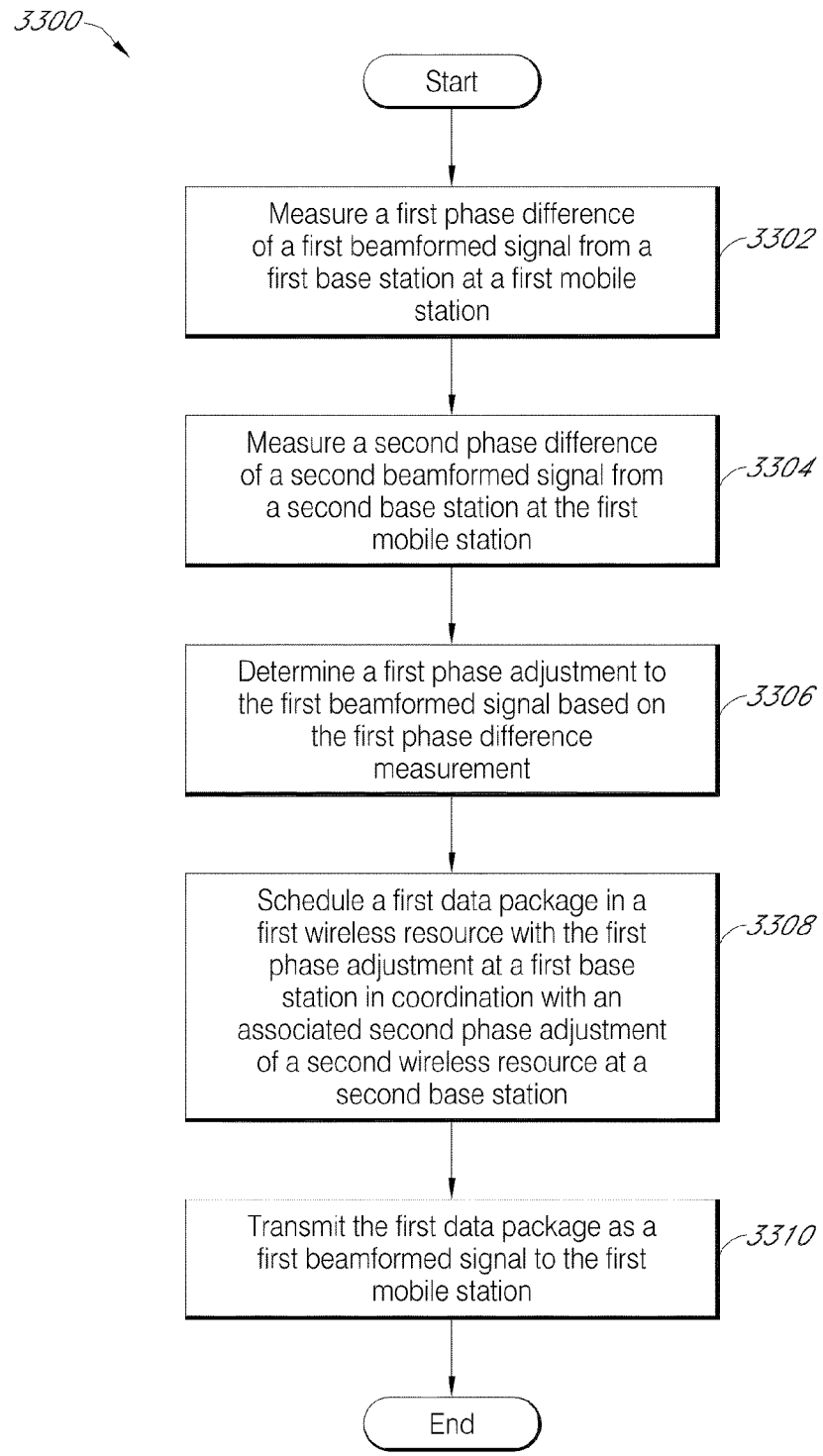
FIG. 33 illustrates a flow diagram depicting processes for scheduling transmissions at a base station in accordance with an embodiment of the present invention.
Figure 34:
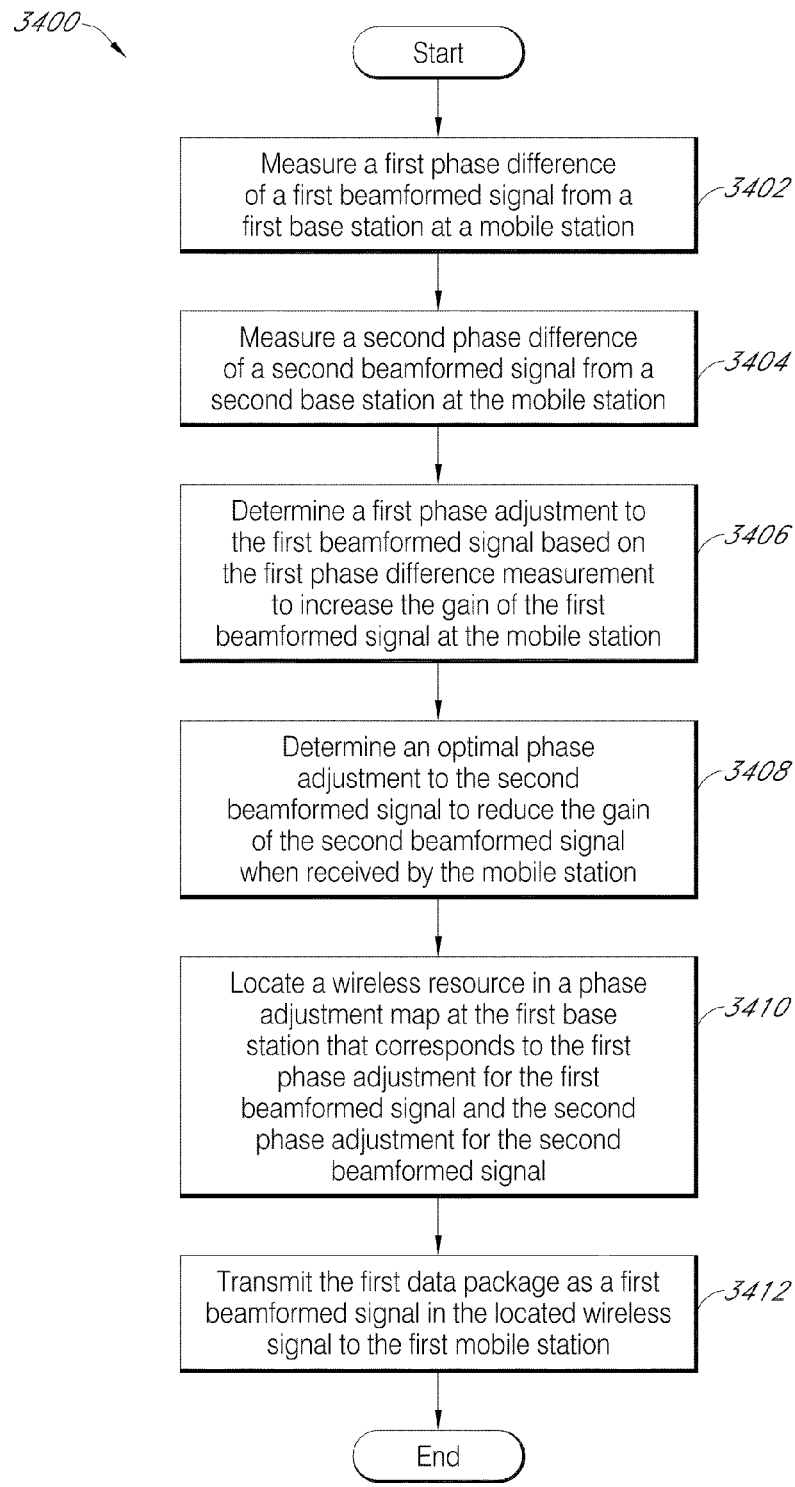
FIG. 34 illustrates a flow diagram depicting processes for scheduling transmissions at a base station in accordance with an embodiment of the present invention.

FIGS. 33 and 34 illustrate another embodiment of the scheduling process. FIG. 33 illustrates a flow diagram 3300 of processes for scheduling transmissions at a base station in accordance with an embodiment of the present invention. This flow diagram may be used alone or in conjunction with the scheduling processes shown in FIGS. 23 and 24 to illustrate the scheduling process. Again, it should be understood that this process could be executed using one or more computer-executable programs stored on one or more computer-readable media located on any one of the base station devices (e.g., 606a-c, 612, 700, and BS 1 and BS 2 of FIGS. 10 and 11) or in the server computer 800 in FIG. 8, or in the wireless user equipment 608a-c, 622, 624, 626. The scheduling process 3300 begins at block 3302 by measuring a first phase difference of a first beamformed signal from a first base station at a first mobile station. In one example, the measurement may be performed by a phase difference measurement unit 914. At block 3304 the process measures a second phase difference of a second beamformed signal from a second base station at the first mobile station.

Next, at block 3306, the process determines a first phase adjustment to the first beamformed signal based on the first phase difference measurement. This phase adjustment may be a four-level quantized phase adjustment, and may be determined at the CPE, at a base station, or at a central server computer. This first phase adjustment may correspond to the "Phase Adjustment for best signal level" in FIG. 22. At block 3308, the process schedules a first data package in a first wireless resource with the first phase adjustment at a first base station in coordination with an associated second phase adjustment of a second wireless resource at a second base station. This scheduling process may be performed according to the scheduling algorithm described in FIGS. 20-32. Finally, at block 3310, the process transmits the first data package as a first beamformed signal to the first mobile station.

FIG. 34 illustrates another flow diagram of processes for scheduling transmissions at a base station in accordance with an embodiment of the present invention. This flow diagram may be used alone or in conjunction with the scheduling processes shown in FIGS. 23, 24, and 33 to illustrate the scheduling process. Again, it should be understood that this process could be executed using one or more computer-executable programs stored on one or more computer-readable media located on any one of the base station devices (e.g., 606*a-c*, 612, 700, and BS 1 and BS 2 of FIGS. 10 and 11) or in the server computer 800 in FIG. 8, or, or in the wireless user equipment 608*a-c*, 622, 624, 626.

Referring to FIG. 34, the scheduling process 3400 begins at block 3402 by measuring a first phase difference of a first beamformed signal from a first base station at a mobile station. Next, at block 3404, the process measures a second phase difference of a second beamformed signal from a second base station at the mobile station. Next, at block 3406 the process determines a first phase adjustment to the first beamformed signal based on the first phase difference measurement to increase the gain of the first beamformed signal at the mobile station. This first phase adjustment may correspond to the "Phase Adjustment for best signal level" in FIG. 22. At block 3408 the process determines an optimal phase adjustment to the second beamformed signal to reduce the gain of the second beamformed signal when received by the mobile station. This second phase adjustment may correspond to the "Optimum Phase Adjustment (in degrees) to reduce interference level and priority for interference reduction" in FIG. 22. Next, at block 3410, the process continues by locating a wireless resource in a phase adjustment map at the first base station that corresponds to the first phase adjustment for the first beamformed signal and the second phase adjustment for the second beamformed signal. Finally, at block 3412 the first data package is transmitted as a first beamformed signal in the located wireless signal to the first mobile station. Thus, by increasing the gain of the intended signal and decreasing the gain of the second signal, the SINR of the signal to an intended mobile station is greatly improved, improving signal quality for an end user.

FIGS. 35-49 illustrate systems and methods for coordinating the scheduling of beamformed data to reduce interference using more than two bits (e.g., three bits) to quantize the phase angle reported by CPEs to their serving base stations according to another embodiment of the present invention. A customer premise equipment (CPE) uses three bits to quantize the phase angle of the beamformed data received by CPE and reports it to its serving base station. The serving base station selects one of the phase adjustment angles based on the bits received from the CPE in order to coordinate scheduling of the data transmission to the CPE. The phase adjustment angles are in "m" degree steps (e.g., in 90 degree steps). The three bit allows the phase zones to be quantized into eight different regions compared to four when two bits are used. The third bit is used to differentiate between the second most optimal phase angle adjustment and the third most optimal phase angle adjustment. In the present embodiment, the phase adjustment angles are in 90 degree steps so each phase angle adjustment is mapped to two phase angle regions.

A quantized phase angle reporting and a quantized phase angle adjustment are performed to reduce interference and to increase desired signal strength at the CPE in accordance with an embodiment of the present invention. As described in more detail below, a mobile device/CPE (e.g., 108, 608*a-c*, 622, 624, 626, 900, MS1 and MS2) measures the phase difference (e.g., via phase difference measurement unit 914) between the two signals that it receives from each of the base station transmitters and transmits back the measurements (also may be referred to as "the phase difference/angle information" or "quantized phase difference/angle information") to its serving base station. This measurement is quantized to one of eight values by rounding the measured difference to the nearest of the angles in the form $22.5°+n*45°$, where $0<=n<=7$.

Figures 35, 36:
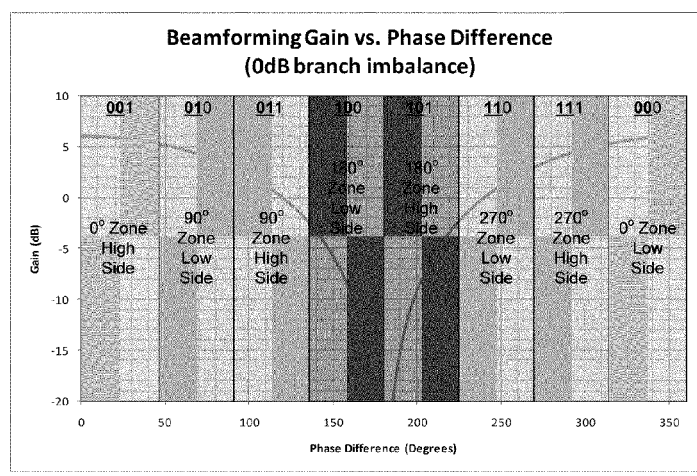
FIG. 35 illustrates a table mapping the three bit message to eight quantized phase angle zones/regions according to an embodiment of the present invention.
FIG. 36 illustrates a plot of the beamforming gain versus the phase difference of two signals with 0 dB branch imbalance at a receiver corresponding to quantized phase difference zones according to an embodiment of the present invention.

FIG. 35 illustrates a table 3500 mapping the three bit message (or quantized phase angle information) to eight quantized phase angle zones/regions according to an embodiment of the present invention. Each of the three bit binary values is mapped to a quantized phase difference, a range of phase differences, and a zone name. For example, the binary value "000" is associated with the quantized phase difference of 337.5°, the range of phase differences of 315° to 360°, the zone name of 0° Zone Low Side. The binary value "001" is associated with the quantized phase difference of 22.5°, the range of phase differences of 0° to 45°, and the zone name of 0° Zone High Side.

FIG. 36 illustrates a plot 3600 of the beamforming gain versus the phase difference of two signals with 0 dB branch imbalance at a receiver corresponding to quantized phase difference zones according to an embodiment of the present invention. The eight zones in FIG. 36 correspond to the eight zones listed in table 3500.

Referring to FIGS. 35 and 36, a quantized phase angle reporting and a quantized phase angle adjustment are performed to reduce interference and to increase desired signal strength at the CPE according an embodiment of the present invention. A mobile device/CPE 608*a-c*, for example, measures the phase difference between the two signals that it receives from each of the base station transmitters and transmits back the measurements to its serving base station. This measurement is quantized by the mobile device to one of eight values in table 3500 by rounding the measured difference to the nearest of the angles in the form $22.5°+n*45°$, where $0<=n<=7$. The quantized phase difference information is transmitted to the serving base station in a signaling message as three binary bits.

Quantizing the phase difference to one of eight values has the advantage that the messaging overhead to a base station is reduced when compared to quantization to a larger number of values (e.g., it would require nine binary bits to signal a phase difference quantized to 1 degree steps). This helps efficiency while not being computationally burdensome for scheduling.

When the serving base station (or server computer 800) receives the quantized phase difference, it can adjust the phase on one of the transmitters (e.g., in one of the transmitting antennas in a beamforming antenna array) so that the phase difference of the beamformed signals arriving at the mobile station fall into one of the eight zones. In the present embodiment, only four phase adjustment angles are used: 0 degree, 90 degrees, 180 degrees and 270 degrees (=−90 degrees). More than four phase adjustment angles may be used in other embodiments.

The optimum phase adjustment is zero degree if the measured phase difference falls into one of the zero degree zones. The optimum phase adjustment is 90 degrees if the phase measurement falls into one of the 90 degree zones. This will cause the signals arriving at the CPE to have a phase difference of between 315 degrees (i.e., −45 degrees) and 45 degrees, which provides the most gain. Similarly, the optimal phase adjustment for signals with phase measurements that fall into the 180 degree and 270 degree zones are 180 degrees and 270 degrees, respectively. The second most optimal phase adjustment/correction depends on where in a given zone a phase measurement falls.

Figure 37:
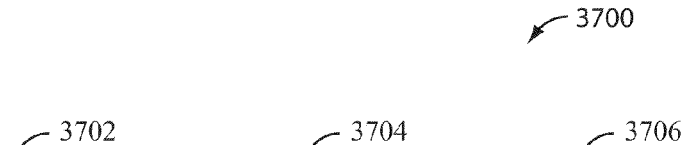
FIG. 37 illustrates a table showing the average gain of the combined signal relative to the signal transmitted from one of the antennas for each of the quantized phase zones according to an embodiment of the present invention.

FIG. 37 illustrates a table 3700 showing the average gain of the combined signal relative to the signal transmitted from one of the antennas for each of the quantized phase zones according to an embodiment of the present invention. Table 3700 has a first column 3702 listing the phase zones, a second column 3704 listing an average gain in the signal received by the mobile device for a particular phase zone, and a third column 3706 listing the difference from 0 degree phase zone average gain.

On average, the strongest signal strength is achieved if the phases are adjusted so that the phase difference at the receiver falls into one of the 0° zones, i.e., 0° Zone Low Side or 0° Zone High Side. If the phase difference is adjusted so that it falls in either the 90° or 270° zones, then on average the combined signal strength is 3 dB lower than the average signal strength achieved in the 0° zone. If the phase difference is adjusted such that it falls in the 180° zone, then on average the combined signal is attenuated by 14 dB relative to the signal in the 0° zone. However, if the phase can be adjusted so that it falls into either the 90° Low Side or 270° High Side, then the combined signal strength is on average only 1.4 dB lower than the optimum adjustment where the phases difference would fall in the 0° Zone Low Side (or 0° Zone High Side). Since the phase adjustment takes place in 90 degree steps in the present embodiment, the second best phase adjustment depends on whether the phase difference detected by the mobile device falls onto the Low Side or High Side of the phase measurement zones.

Figure 38:
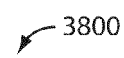
FIG. 38 illustrates a table showing the best, second best and third best phase adjustment steps for optimal signal combining for each of the phase difference measurement zones according to an embodiment of the present invention.

FIG. 38 illustrates a table 3800 showing the best, second best and third best phase adjustment steps for optimal signal combining for each of the phase difference measurement zones according to an embodiment of the present invention. The phase adjustment is performed in 90 degrees steps in the present embodiments. The phase adjustments are made by subtracting the phase measurements to arrive at the adjusted phase difference. For example, a phase adjustment of 90 degrees means that 90 degrees should be subtracted from the phase difference measurement to arrive at the final phase after adjustment.

The best phase adjustment places the adjusted signal in the 0° Zone Low Side or 0° Zone High Side. The 2nd best phase adjustment places the adjusted signal in the 90° Zone Low Side or 270° Zone High Side. The 3rd best phase adjustment places the adjusted signal in the 90° Zone High Side or 270° Zone Low Side. For example, if the mobile device measures the signal phase difference and transmits to the serving base station that the signals are being received at 0° Zone Low Side, the best phase adjustment is 0° to place the signals being received in 0° Zone Low Side. The second best phase adjustment is 270° to place the signals being received in 90° Zone Low Side. Third best adjustment is 90° to place the signals being received in 270° Zone Low Side. The average gain difference between the second best adjustment and the third best adjustment is 3.5 dB, as noted by table 3700. The use of three bits to quantize the phase zones into eight zones by the mobile device enable the serving base station to identify the second and the third best phase adjustments.

For interfering signals, the largest reduction in interfering signal strength is obtained when the phases of the interfering signals are adjusted such that they fall in the 180° Zone Low Side or 180° Zone High Side. The second best case for interference reduction is when the interfering signals are phase adjusted such that they fall into the 90° Zone High Side or 270° Zone Low Side. Unless the phases of the interfering signals can be adjusted to fall within one of the 180° Zones, the interfering signal cannot be reduced significantly and may in fact experience some gain. The average interference level jumps from an average −8.2 dB when the phase adjustment results in a signal that falls in the best interference reduction zone (i.e., within the 180° Zones) to an average of 0.9 dB when the phase adjustment results in a signal that falls in the second best interference reduction zone (i.e., within the 90° Zone High Side or 270° Zone Low Side). Accordingly, it is desirable to schedule data transmissions from a base station to a mobile station in such a way that they occur when the phase adjustments from an interfering base station result in the interfering signal phase falling in the 180° Zones at the mobile station.

Figure 39:
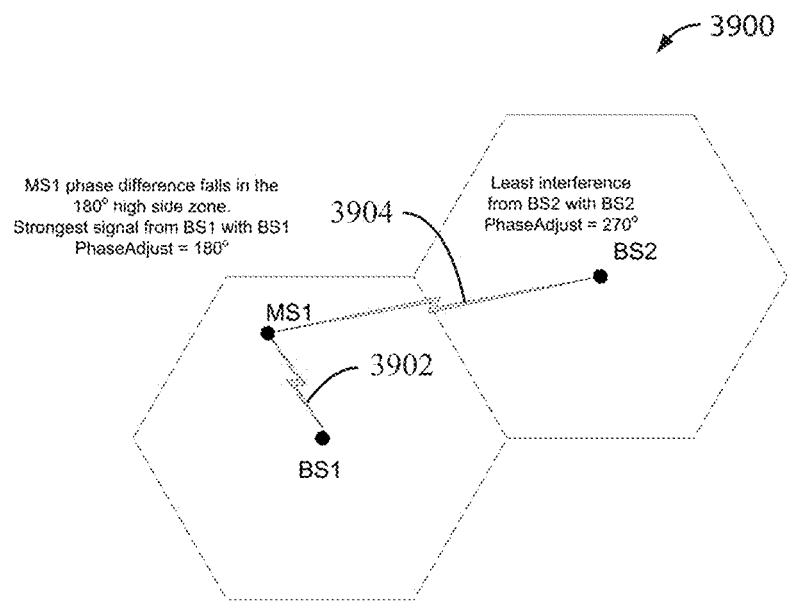
FIG. 39 illustrates a wireless system with a mobile station that is in the coverage area of a base station and receiving interference from an adjacent base station.

FIG. 39 illustrates a wireless system 3900 with a mobile station MS1' that is in the coverage area of a base station BS1' and receiving interference 3504 from an adjacent base station BS2'. Mobile station MS1' is in communication with base station BS1' via beamformed transmission 3902. In an embodiment, mobile station MS1' may be representative of mobile station 900, and base station BS1' and BS2' may be representative of base station 700. The difference in phases of the reference signals that MS1' receives from BS1' is quantized into eight discrete regions, corresponding to a phase difference of 337.5° (or 0° Zone Low Side), 22.5° (or 0° Zone High Side), 67.5° (or 90° Zone Low Side), 112.5° (or 90° Zone High Side), 157.5° (or 180° Zone Low Side), 202.5° (or 180° Zone Low Side), 247.5° (or 270° Zone High Side), and 292.5° (or 270° Zone Low Side). This quantization reduces the amount of feedback required from a mobile station to a base station when communicating the phase difference information. The quantization also reduces computational overhead, while still providing exceptional control over the levels of constructive or deconstructive interference.

In wireless system 3900, the difference in phases of the reference signals that MS1' receives from BS1' falls in the 180° Zone High Side (i.e., the phase difference is in the range 180° to 225°). The best signal from BS1' is achieved when BS1' transmits to MS1' with a phase adjustment of 180° to the signals transmitted to MS1'. The signals that MS1' receives from BS2' is attenuated the largest amount when BS2' adjusts the relative phases of its transmissions by 270°. In other words, the best CINR at MS1' is achieved when BS1' is transmitting to MS1' with a phase adjustment of 180° and BS2' is transmitting to a different CPE in its coverage area with a phase adjustment of 270°.

Figure 40:
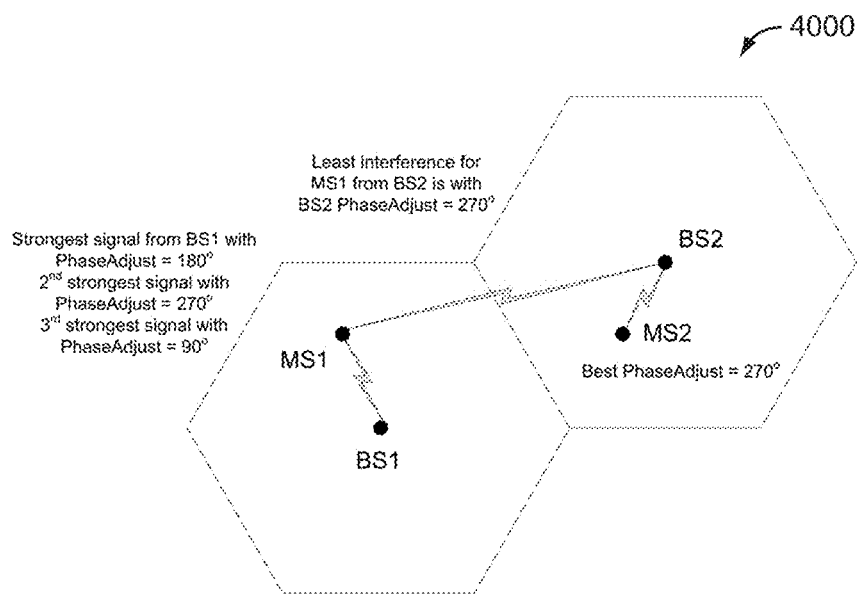
FIG. 40 illustrates a wireless system similar to the wireless system in FIG. 39 with the addition of an additional mobile station MS2'.

FIG. 40 illustrates a wireless system 4000 similar to the wireless system 3900 in FIG. 39 with the addition of an additional mobile station MS2'. Wireless system 4000 shows BS2' transmitting to a mobile station MS2' in its coverage area with a phase adjustment of 270°. The best CINR at MS1' is achieved when BS1' transmits to MS1' with a phase adjustment of 180° since the phase difference falls in the 180° Zone High Side. See table 3800. The second best CINR is achieved if BS1' transmits with a phase adjustment of 270°. The third best CINR is achieved if BS1' transmits with a phase adjustment of 90°. In an embodiment, BS1' coordinates its data transmission to MS1' by selecting the time slots associated with the phase adjustment of 180°, the phase adjustment of 270°, and the phase adjustment of 90°.

FIGS. 41-49 illustrate an example of how data transmissions among multiple base stations can be scheduled such that the interference to adjacent base station sectors is reduced, by coordinating the adjustment of relative phases of the transmitted signals at each base station according to an embodiment of the present invention. The systems and methods disclosed herein for coordinating scheduling of beamformed data may be applied to any wireless technology, including, but not limited to: GSM™, UMTS™, LTE™, LTE Advanced™, Wi-Max™, Wi-Fi™, etc.

The present example assumes that an airlink framing structure has been defined, consisting of eight timeslots, with each timeslot containing multiple frequency slots, as with the previous example that used a two-bit quantization. See FIG. 20 and the phase adjustment map 2000. The four base stations A, B, C, and D are assigned a fixed phase transmission pattern in timeslots 0-3. The 32 frequency slots in a time slot are divided into eight groups of four each. Each group of frequency slots is allocated a fixed phase adjustment value. For timeslots 4-7, any phase may be transmitted in any frequency slot. These slots are used when the coordinating scheduling cannot be completed in the first four timeslots and for transmissions which are not interference limited. Thus, timeslots 4-7 may be considered to be "all purpose" timeslots for transmissions where interference is not an issue and for when guaranteed phase differences are not required.

The assignment of phase adjustments to frequency and time slots in a phase adjustment map can be done in a variety of ways, e.g., a fixed assignment or dynamic determination, as explained in a previous example. In a fixed assignment, phase differences are allocated beforehand, using a reuse pattern, similar to the frequency reuse patterns commonly employed in cellular wireless systems. In a dynamic assignment, the phase adjustment map is dynamically determined based on the phase difference measurements made by the mobile station.

FIG. 41 illustrates a CPE phase management table 4100 at base station A with various mobile station transmission and interference data in accordance with an embodiment of the present invention. For this example, Base Station A (BTS A) has 10 mobile stations/CPE to which it will transmit data. The number of blocks of data and the zones into which the measured base station reference signals fall are shown in table 4100. The optimal phase adjustment angle to be used by BTS A to transmit to the CPEs along with the second and third best phase adjustments are also is shown table 4100. Additionally, the best phase adjustment angles that the base stations causing interference with CPEs should use to minimize the interference levels is shown in the table.

The entries in the interfering BTS phase adjustment cells have two numbers. The top entry is the phase adjustment in degrees for a given interfering BTS that results in the lowest levels of interference at the mobile station when signals are received from that interfering BTS. The bottom entry is a priority that is assigned to each of the interferers, indicating the relative importance of reducing the interference levels. In the present embodiment, the priority ranking is 1 to 4, with 1 being the highest priority and having the greatest need to reduce interference. The priority can be assigned in a variety of ways according to implementation. For example, the priority can be assigned to place the highest priority on reducing interference from the strongest interferers seen by CPEs with the lowest CINR, or on base stations causing the greatest levels of interference to a CPE, or using some other prioritization scheme.

FIGS. 42-47 illustrate a process for coordinating the scheduling of beamformed data to reduce interference according to an embodiment of the present invention. FIG. 42 illustrates an empty transmission schedule 4200 at a base station A at the start of the scheduling process.

FIG. 43 illustrates a transmission schedule 4300 for addressing first-priority interference (or priority 1 interference) from base station B according to an embodiment of the present invention. The CPE and number of blocks to be transmitted are shown in the time slot and frequency map. The number of blocks to be transmitted to a CPE is shown in square parentheses next to the CPE ID. The CPEs that are scheduled in each step are shown in a bold font.

In the step associated with schedule 4300, the optimal scheduling location for CPE #1 is timeslot #2 on the frequency resources that have a phase adjustment of zero degree from base station A. In timeslot #2, on those same frequency resources, base station B is guaranteed to transmit to CPEs in its coverage area with a phase adjustment of 180 degrees.

There are 14 blocks of data to be transmitted to CPE #1. Only eight of the 14 blocks of data are transmitted in timeslot #2 with the phase adjustment of zero degree because there are only 8 time/frequency resources available in this example. The remaining six blocks of data needs to be transmitted to CPE #1 using a different set of time/frequency resources. Since the best gains are achieved by making sure that the transmissions to CPE #1 are scheduled for when base station B uses a phase adjustment of 180 degrees, the scheduling process should choose the time/frequency resources where base station B transmits with a 180 degree phase adjustment. The scheduling process also should choose the second best phase adjustment from base station A. In this case that means a phase adjustment of 90 degrees (see table 4100). The remaining six blocks are scheduled for timeslot #1, on the frequency resources where base station A has a phase adjustment of 90 degrees and base station B has a phase adjustment of 180 degrees.

Similarly, the optimal scheduling location for CPE #5 is in timeslot #1 on the frequency resources with a phase adjustment of 180 degrees from base station A. Base station B transmits with a phase adjustment of 270 degrees on this set of time frequency resources. Since there are only 6 blocks to be transmitted to CPE #5, all of the blocks can be scheduled on these time/frequency resources.

There are 22 blocks of data to be transmitted to CPE #10 from base station A. Ideally all of these blocks should be scheduled for transmission in timeslot #0 in the frequency resources with a phase adjustment of 270 degrees. Base station B will transmit with a phase adjustment of 270 degrees on these resources, minimizing the level of interference seen at this CPE #10. Only eight of the twenty-two blocks can be scheduled for these time/frequency resources. Eight additional blocks can be scheduled in the second best option for CPE #10, which is in timeslot #3 on the frequency resources with a phase adjustment of 0 degree from base station A (see table 4100).

The third best option for transmissions to CPE #10 is where the phase adjustment from base station A is 180 degrees and from base station B is 270 degrees. This is located in timeslot #1. However, six of the eight frequency resources with these phase adjustments are already in use for CPE #5 transmissions, so only two of the remaining six blocks of data for CPE #10 can be scheduled on these resources. The remaining four blocks of data for CPE #10 are scheduled in timeslot #4. In this case, the transmit phase adjustment for the transmissions is set to the optimal of 270 degrees from base station A. Note that there are no guarantees on the phase adjustments that will be used by base station B on these resources.

FIG. 44 illustrates a transmission schedule 4400 for addressing first-priority interference from base station C according to an embodiment of the present invention. In addressing the first-priority interference from base station C, the transmissions for CPE #3 and CPE #8 are scheduled in a similar manner to the transmissions for CPE #10. Eight of the twelve data blocks to be transmitted to CPE #3 are scheduled for timeslot 2, phase adjustment of 90 degrees, which corresponds to a phase adjustment of 0 degrees at base station C. The remaining four data blocks for CPE #3 are scheduled on timeslot #0, again with an optimal phase adjustment of 0 degree at base station C for interference minimization, but a second best phase adjustment of 0 degree for desired signal combining at base station A.

The two blocks of data for CPE #8 are scheduled for their optimal time/frequency resources on timeslot #3, with a phase adjustment of 270 degrees from base station A and zero degree from base station C.

FIG. 45 illustrates a transmission schedule 4500 after addressing first-priority interference from base station D according to an embodiment of the present invention. All eight blocks for CPE #2 are scheduled for timeslot #1 with a phase adjustment of 0 degree from base station A and 270 degrees for base station D.

FIG. 46 illustrates a transmission schedule 4600 for addressing second-priority interference (or priority 2 interference) from base station B according to an embodiment of the present invention. The priority 2 interferences are processed after the priority 1 interference for base stations B, C, and D have been processed. Eight blocks for CPE #7 are scheduled in the optimal position in timeslot #1 while the remaining two blocks are scheduled for timeslot #2 where the phase adjustment for base station B is still the optimal 0 degree and the second best phase adjustment of 180 degrees from base station A is achieved.

FIG. 47 illustrates a transmission schedule 4700 for addressing second-priority interference from base station D according to an embodiment of the present invention. The scheduling process moves to process the priority 2 interference from base station D since there is no remaining blocks with priority 2 interference from base station C to be scheduled. The optimal scheduling location for CPE #4 is on timeslot #1 on the frequency resources with a phase adjustment of 90 degrees from base station A and a phase adjustment of 0 degree from base station D. Since there are already six blocks of data scheduled on those resources and there are only eight such resources available, only two of the blocks of data for CPE #4 can be sent on those resources. The remaining four blocks are sent on timeslot #3 with the second best phase adjustment from base station A of 180 degrees and a phase adjustment of zero degree from base station D.

FIG. 48 illustrates a transmission schedule 4800 for addressing priority 3 interference according to an embodiment of the present invention. There is only one priority 3 interference to process. The optimal location for CPE #6 is with a phase adjustment of 180 degrees from base station A. In this case there are two priority 3 interference sources—from base station B and base station D. The scheduling process can schedule the blocks for CPE #6 in timeslot #2, where the interference from base station B will be reduced, or on timeslot #3 where the interference from base station D will be reduced. Four resource blocks are sent on timeslot #3 and two resource blocks are sent on timeslot #2.

FIG. 49 illustrates a transmission schedule 4900 for addressing priority 4 interference according to an embodiment of the present invention. There is one priority 4 to schedule, i.e., CPE #9. This CPE has the lowest priority level for scheduling. Since the best signal for this CPE is with a phase adjustment of 270 degrees from base station A, the scheduling process schedules transmissions to this CPE in the available time/frequency resources with the phase adjustment of 270 degrees.

The scheduling examples above describe how transmissions from base station A to the CPEs are scheduled according to embodiments of the present invention. The scheduling of transmissions to CPEs served by base stations B, C and D are scheduled in a similar manner. In some cases it may not be possible to match up all CPE transmissions with the best, the second best, or the third best phase adjustment. In those cases the CPE transmissions will be scheduled on timeslots #4 to #7, with optimal transmit phase adjustments from the serving base stations, but with no guarantees on the phase adjustments from any interfering base stations.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

What is claimed is:

1. A computer implemented method for transmitting beamformed data to a mobile station, the method comprising:
   receiving a quantized phase angle information of a reference signal from a mobile station at a first base station that transmitted the reference signal to the mobile station;
   selecting a first phase adjustment angle based on the quantized phase angle information received from the mobile station;
   scheduling a first data package in a first wireless resource with the first phase adjustment at the first base station in coordination with an associated second phase adjustment of a second wireless resource at the second base station; and
   transmitting a first beamformed signal that is provided with the first phase adjustment angle based on the received quantized phase angle information to the mobile station from the first base station.

2. The method of claim 1, wherein the quantized phase angle information received is associated with one of eight quantized phase angle zones, wherein the reference signal is a beamformed signal.

3. The method of claim 1, wherein the quantized phase angle information is received by the first base station from the mobile station in a form of three-bit information.

4. The method of claim 1, wherein the first base station is a serving base station for the mobile station, and the mobile station is receiving an interference signal from a second base station, and
   wherein the first beamformed signal is transmitted to the mobile station by the first base station as part of the first data package.

5. The method of claim 4, further comprising:
   scheduling a second data package in the second wireless resource with a third phase adjustment at the first base station in coordination with the associated second phase adjustment of the second wireless resource at the second base station; and
   scheduling a third data package in a third wireless resource with a fourth phase adjustment at the first base station in coordination with the associated second phase adjustment of a second wireless resource at the second base station, wherein the first phase adjustment is the optimal phase angle correction, the third phase adjustment is the second most optimal phase angle correction, and the fourth phase adjustment is the third most optimal phase angle correction.

6. The method of claim 4, wherein the first wireless resource at the first base station corresponds to a first timeslot associated with at least one frequency, and wherein the second wireless resource at the second base station corresponds to the first timeslot associated with the at least one frequency of the first base station.

7. The method of claim 4, wherein the first phase adjustment is a quantized phase adjustment that determines the amount of constructive interference in the first beamformed signal as received by the mobile station; and wherein the second phase adjustment is a quantized phase adjustment that determines the amount of destructive interference in the interference signal as received by the mobile station.

8. The method of claim 4, wherein the first data package is transmitted in the first wireless resource such that the second phase adjustment associated with the interference signal transmitted by the second base station is selected to cause the interference signal to be received as deconstructive interference at the mobile device.

9. The method of claim 4, wherein the first phase adjustment and the second phase adjustment are associated via a first phase adjustment map associated with the first base station and a second phase adjustment map associated with the second base station, the first phase adjustment map and the second phase adjustment map aligning the first wireless resource and the first phase adjustment with the second wireless resource and the second phase adjustment.

10. The method of claim 1, wherein the quantized phase angle information received is associated with one of eight quantized phase angle zones, and the first phase adjustment angle is associated with one of four phase adjustment angles.

11. The method of claim 10, wherein the four phase adjustments angles are provided in 90 degree steps, and the reference signal is a beamformed signal.

12. A computer implemented method for receiving beamformed data from a base station, the method comprising:

receiving a first signal from a first base station at a mobile station;

measuring a first phase difference of the first signal at the mobile station;

transmitting a quantized phase angle information of the first signal based on the first phase difference measured by the mobile station to a first base station that transmitted the first signal to the mobile station; and receiving a first beamformed signal that is provided with a first phase adjustment angle from the first base station, wherein the first phase adjustment angle is selected by the first base station based on the quantized phase angle information transmitted by the mobile station, wherein the first base station is a serving base station for the mobile station, and the mobile station is receiving an interference signal from a second base station, wherein the first beamformed signal is transmitted to the mobile station by the first base station as part of a first data package, and wherein the first base station schedules the first data package in a first wireless resource with the first phase adjustment in coordination with an associated second phase adjustment of a second wireless resource at the second base station.

13. The method of claim 12, wherein the quantized phase angle information received is associated with one of eight quantized phase angle zones, and wherein the first signal is a beamformed signal.

14. The method of claim 12, wherein the quantized phase angle information is received by the first base station from the mobile station in a form of three-bit information.

15. The method of claim 12, wherein the quantized phase angle received is associated with one of eight quantized phase angle zones, and the first phase adjustment angle is associated with one of four phase adjustment angles.

16. The method of claim 12, wherein the four phase adjustments angles are provided in 90 degree steps and the first signal is a beamformed signal.

17. The method of claim 12, further comprising:

receiving a second data package and a third data package from the first base station, wherein the first base station schedules the second data package in a second wireless resource with a third phase adjustment in coordination with the associated second phase adjustment of a second wireless resource at the second base station, and wherein the first base station schedules the third data package in a third wireless resource with a fourth phase adjustment in coordination with the associated second phase adjustment of a second wireless resource at the second base station, wherein the first phase adjustment is the optimal phase angle correction, the third phase adjustment is the second most optimal phase angle correction, and the fourth phase adjustment is the third most optimal phase angle correction.

18. The method of claim 12, wherein the first wireless resource at the first base station corresponds to a first timeslot associated with at least one frequency, and wherein the second wireless resource at the second base station corresponds to the first timeslot associated with the at least one frequency of the first base station.

19. The method of claim 12, wherein the first phase adjustment is a quantized phase adjustment that determines the amount of constructive interference in the first beamformed signal as received by the mobile station; and wherein the second phase adjustment is a quantized phase adjustment that determines the amount of destructive interference in the interference signal as received by the mobile station.

20. The method of claim 12, wherein the first data package is transmitted in the first wireless resource such that the second phase adjustment associated with the interference signal transmitted by the second base station is selected to cause the interference signal to be received as deconstructive interference at the mobile device.

21. The method of claim 12, wherein the first phase adjustment and the second phase adjustment are associated via a first phase adjustment map associated with the first base station and a second phase adjustment map associated with the second base station, the first phase adjustment map and the second phase adjustment map aligning the first wireless resource and the first phase adjustment with the second wireless resource and the second phase adjustment.

22. A wireless communication system provided at a base station for coordinating the scheduling of beamformed data to reduce interference, the system comprising:

a processor;

a receiver; and a transmitter, wherein the system is configured to:

transmit a first signal to a mobile station, receive a quantized phase angle information of the first signal from the mobile station, select a first phase adjustment angle based on the received quantized phase angle information from the mobile station, schedule a first data package in a first wireless resource with the first phase adjustment at the first base station in coordination with an associated second phase adjustment of a second wireless resource at a second base station, and transmit a first beamformed signal that is provided with the first phase adjustment angle based on the received quantized phase angle information to the mobile station.

23. A wireless communication system for coordinating the scheduling of beamformed data to reduce interference, the system comprising:

a first base station;

a second base station;

a data communication network facilitating data communication amongst the first base station and the second base station; and a first mobile station, wherein a first beamformed signal received by the first mobile station from the first base station is received as a communication, wherein a second beamformed signal received by the first mobile station from the second base station is received as interference, and wherein the system is configured to:

transmit a first signal to a mobile station, receive a quantized phase angle information of the first signal from the mobile station, select a first phase adjustment angle based on the received quantized phase angle information from the mobile station, schedule a first data package in a first wireless resource with the first phase adjustment at the first base station in coordination with an associated second phase adjustment of a second wireless resource at the second base station, and transmit a first beamformed signal that is provided with the first phase adjustment angle based on the received quantized phase angle information to the mobile station from the first base station.

* * * * *